United States Patent
Doriot

(10) Patent No.: US 10,627,978 B2
(45) Date of Patent: Apr. 21, 2020

(54) VIRTUAL STACK BUTTON FOR SOFTWARE HAVING A BRANCHED TASK STRUCTURE

(71) Applicant: Dodles, Inc., Combined Locks, WI (US)

(72) Inventor: Craig W. Doriot, Combined Locks, WI (US)

(73) Assignee: Dodles, Inc., Combined Locks, WI (US)

(*) Notice: Subject to any disclaimer, the term of this patent is extended or adjusted under 35 U.S.C. 154(b) by 103 days.

(21) Appl. No.: 15/832,760

(22) Filed: Dec. 5, 2017

(65) Prior Publication Data
US 2019/0171355 A1    Jun. 6, 2019

(51) Int. Cl.
| | |
|---|---|
| *G06F 3/0481* | (2013.01) |
| *G06F 3/0488* | (2013.01) |
| *G06F 3/0484* | (2013.01) |
| *G06F 9/448* | (2018.01) |
| *G06F 9/451* | (2018.01) |
| *G06F 3/0482* | (2013.01) |

(52) U.S. Cl.
CPC .......... *G06F 3/0481* (2013.01); *G06F 3/0482* (2013.01); *G06F 3/04817* (2013.01); *G06F 3/04842* (2013.01); *G06F 3/04886* (2013.01); *G06F 9/448* (2018.02); *G06F 9/451* (2018.02)

(58) Field of Classification Search
CPC ............. G06F 3/04886; G06F 3/04842; G06F 3/0481; G06F 3/04817; G06F 3/0482; G06F 9/451; G06F 9/448
See application file for complete search history.

(56) References Cited

U.S. PATENT DOCUMENTS

| | | |
|---|---|---|
| 5,734,794 A | 3/1998 | White |
| 5,912,675 A | 6/1999 | Laperriere |
| 6,307,576 B1 | 10/2001 | Rosenfeld |
| 6,560,361 B1 | 5/2003 | Collins |
| 7,188,313 B2 | 3/2007 | Hughes, Jr. et al. |

(Continued)

OTHER PUBLICATIONS

Google, "Google Chrome Web Browser Version 49.0.2623", (Released on Mar. 2, 2016), p. 1-9 (Year: 2016).*

(Continued)

*Primary Examiner* — Ajay M Bhatia
*Assistant Examiner* — Mong-Shune Chung
(74) *Attorney, Agent, or Firm* — Stephen C. Jensen; Northwind IP Law, S.C.

(57) ABSTRACT

Navigation tools and techniques for software are disclosed. Various types of virtual buttons can be used in the GUI of a software program to make it easier for a user to navigate across or through different branched or hierarchical tasks defined by the software. The virtual button can function to accept, execute, close, or exit a given open, active branched task, as well as save or store a setting of the active branched task for use by another branched task. The virtual button includes a visual indicator that is indicative of how many of the branched tasks are currently open. The virtual button may represent a stack of buttons, or a stack of branched, open tasks, but where only one of such branched tasks may be active, i.e., subject to user input and interaction, at a given time. Related methods, storage media, devices, and systems are also disclosed.

20 Claims, 16 Drawing Sheets

(56) References Cited

U.S. PATENT DOCUMENTS

| | | |
|---|---|---|
| 7,231,229 B1 | 6/2007 | Hawkins et al. |
| 7,483,570 B1 | 1/2009 | Knight |
| 7,730,401 B2 | 6/2010 | Gillespie et al. |
| 7,859,538 B2 | 12/2010 | Isner et al. |
| 8,373,704 B1 | 2/2013 | Mueller |
| 8,812,980 B2 | 8/2014 | Burt |
| 8,832,552 B2 | 9/2014 | Arrasvuori et al. |
| 9,019,278 B2 | 4/2015 | Hodgins et al. |
| 9,069,447 B2 | 6/2015 | Kim et al. |
| 9,171,390 B2 | 10/2015 | Sumner et al. |
| 9,195,361 B1 | 11/2015 | Gil de Paiva et al. |
| 9,372,616 B2 | 6/2016 | Lection et al. |
| 9,448,686 B2 | 9/2016 | Jung et al. |
| 9,451,306 B2 | 9/2016 | Sarukkai et al. |
| 9,471,198 B2 | 10/2016 | Kunz |
| 9,489,761 B2 | 11/2016 | Edwards et al. |
| 2002/0191029 A1 | 12/2002 | Gillespie et al. |
| 2009/0254859 A1 | 10/2009 | Arrasvuori et al. |
| 2013/0046869 A1* | 2/2013 | Jenkins .................. H04L 67/22 709/223 |
| 2014/0157211 A1 | 6/2014 | Tian |
| 2014/0274373 A1 | 9/2014 | Olshan et al. |
| 2014/0337730 A1* | 11/2014 | King ....................... G06F 16/44 715/716 |
| 2015/0067534 A1* | 3/2015 | Choi ...................... G06F 3/0482 715/752 |
| 2016/0103573 A1* | 4/2016 | Jones ..................... G06F 3/0483 715/777 |
| 2016/0110220 A1 | 4/2016 | Gralhoz et al. |
| 2017/0357437 A1* | 12/2017 | Peterson ............... G06F 3/0486 |
| 2018/0005259 A1* | 1/2018 | Nair ................... G06Q 30/0236 |

OTHER PUBLICATIONS

International Search Report and Written Opinion for PCT International Application No. PCT/US2018/063876, dated Feb. 27, 2019, 6 pages.

Printout of "Bootstrap Progress bar Form" from formoid.com website, 7 pages, printed Nov. 22, 2017.

Screen Shots of Windows 7 Professional software, 8 pages (including explanatory cover sheet), 2009.

* cited by examiner

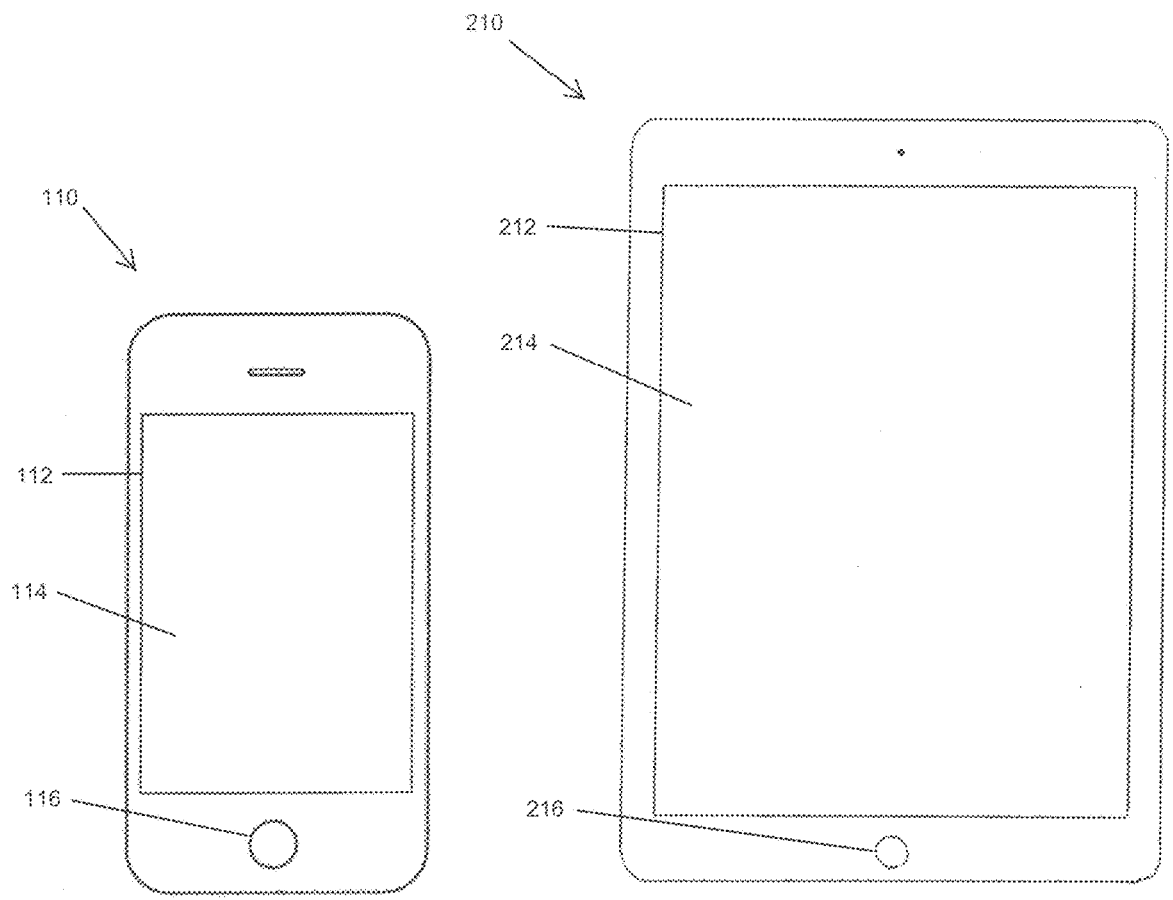
FIG. 1
FIG. 2
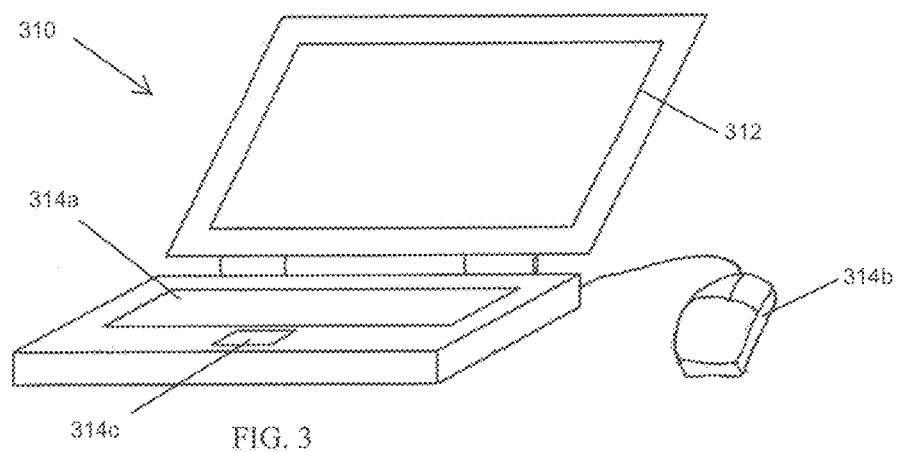
FIG. 3

VIRTUAL STACK BUTTON FOR SOFTWARE HAVING A BRANCHED TASK STRUCTURE

FIELD OF THE INVENTION

This disclosure relates generally to software, and more particularly to software that provides a graphical user interface (GUI) on the display of a microprocessor-based electronic device. The disclosure has special applicability to software that provides a plurality of distinct tasks organized in a hierarchical or branched structure. The disclosure also relates to associated articles, systems, and methods.

BACKGROUND

Numerous software products—referred to herein as software programs, or simply, programs—are known. Many years ago, most software programs were designed for use on desktop or laptop computers, in which the display is at least about the size of a standard sheet of office paper, e.g., 8.5×11 inches. Stated differently, the display for such devices has a characteristic dimension of at least about 14 inches, measured diagonally between opposite corners of the generally rectangular display screen.

In recent years there has been explosive growth in the sales of smart phones, tablet computers, smart watches, and similar handheld devices, whose display screens have characteristic dimensions substantially smaller than 14 inches. The screen size on a handheld device may be for example less than 9 inches, or less than 8 inches, or in a range from 1 to 9 inches or from 4 to 8 inches. Most smart phones have screen sizes from 6 to 7 inches. Despite the small size of the display screen, software programs made for use with such handheld devices, sometimes referred to as applications or "apps", may have a high degree of functionality and complexity. For example, such software programs may define a plurality of distinct tasks that are hierarchical or branched in nature, as explained further below. Hierarchical tasks can be easily provided for when implemented on the large display screen of a desktop or laptop computer by providing separate virtual windows for each task, where multiple such windows overlap in a layered fashion within the boundary of the display screen, and each window has its own set of functional graphical elements such as virtual buttons that the user can click, touch, or otherwise trigger to perform operations.

There is an ongoing need for new software tools and features that can make it easier for users to operate and navigate software, especially software that is implemented on devices with smaller screens.

SUMMARY

We disclose herein, among other things, various types of virtual buttons that can be used in the graphical user interface (GUI) of a software program to make it easier for a user to navigate across or through different tasks defined by the software, in particular, branched or hierarchical tasks of the software. Such a virtual button can have the function of one or more of accepting, executing, closing, or exiting a given open, active branched task, as well as saving or storing a setting of the active branched task for use by one or more of the other branched tasks. Significantly, the virtual button includes a visual indicator that is indicative of how many of the branched tasks are currently open. The visual indicator is related to the fact that the virtual button represents a stack of buttons, or a stack of branched, open tasks, but where only one of such branched tasks may be active, i.e., receptive to user input and interaction, at a given time, the other branched tasks being open but paused or suspended.

The virtual buttons disclosed herein can be used with software operating on virtually any electronic device platform, including large desktop computers having large display screens, and smaller devices, including handheld devices whose display screens are much smaller as discussed above. The virtual buttons are however particularly useful for the smaller screens because of the relatively limited active or useful area available on such displays. The disclosed virtual buttons can help make more efficient use of the available area of the display, preferably by offering a consistent location for the user to select or trigger task completion, while keeping the user informed of how many open tasks remain.

We also disclose computer-implemented methods for providing graphical user interfaces (GUIs) for a number N of simultaneously open branched tasks in a software program. Such methods include designating a first task of the simultaneously open branched tasks as active, and designating remaining one(s) of the simultaneously open branched tasks as suspended. The methods may also include displaying a first GUI when the first task is active, the first GUI comprising a first virtual button. The methods may further include providing the first virtual button with a visual indicator that is indicative of N, as well as configuring the first virtual button such that, when it is triggered by a user, the first task closes such that there are only N−1 simultaneously open branched tasks, and a second task of the suspended, remaining one(s) of the simultaneously open branched tasks becomes active, and a second GUI is displayed.

The method may be carried out by a device having a display, and each GUI of the simultaneously open branched tasks, when displayed, may fill a same major space on the display. The display may have a characteristic dimension less than 9 inches, and the same major space on the display may be substantially an entire active area of the display. The method may be carried out by a device having a display, and the second GUI may include a second virtual button which, when triggered by the user, closes the second task, and the second virtual button may fill substantially a same minor space on the display as the first virtual button. Each GUI of the simultaneously open branched tasks may have a respective virtual button which, when triggered by the user, closes its respective task, and the respective virtual buttons, when displayed, may fill substantially the same minor space on the display. The respective virtual buttons, when displayed, may fill the same minor space on the display.

Furthermore, the respective virtual buttons may fill respective minor spaces that overlap each other such that for any two of the respective minor spaces, one such minor space is encompassed by and underfills another such minor space. Triggering of the first virtual button by the user may also cause a setting of the first task to be stored and used by one or more of the remaining one(s) of the simultaneously open branched tasks. The visual indicator may include one, some, or all of: bar-shaped elements located on the first virtual button; a layered border of the first virtual button, the layered border optionally having a number of apparent layers equal to N; a brightness of at least a portion of the virtual button; an alphanumeric symbol; and a first non-alphanumeric symbol associated with the first task. In some cases, the visual indicator does not include any numerical character. The method may be carried out by a processing device in connection with a display and a user input device that interacts with the display.

We also disclose non-transitory computer-readable storage media having instructions that, when executed by a processing device coupled to a display screen, cause the processing device to perform operations comprising: providing a plurality of branched tasks including at least a first and second branched task configured such that when the first branched task is active and the second branched task is initiated, the second branched task becomes active and the first branched task becomes suspended until the second branched task is closed, the plurality of branched tasks optionally also including a third branched task configured such that when the first branched task is suspended and the second branched task is active and the third branched task is initiated, the third branched task becomes active, the second branched task becomes suspended until the third branched task is closed, and the first branched task remains suspended until the second branched task is closed; providing a plurality of GUIs associated respectively with the plurality of branched tasks, the plurality of GUIs including a first GUI for the first branched task, a second GUI for the second branched task, and optionally a third GUI for the third branched task; and displaying on the display screen at any given time an active GUI selected from the plurality of GUIs in accordance with which one of the branched tasks is currently active; wherein the first and second GUIs include respective first and second virtual buttons, configured such that selection by a user of the second virtual button closes the second branched task, and selection by the user of the first virtual button closes the first branched task; wherein the first and second virtual buttons occupy substantially a same minor place on the display screen; and wherein at least the second virtual button includes a visual indicator that is indicative of how many of the branched tasks are currently open.

The first and second virtual buttons may each include the visual indicator, and the visual indicator may include one, some, or all of: bar-shaped elements; a layered border; a brightness; an alphanumeric symbol; and a non-alphanumeric symbol. In some cases, the visual indicator does not include any numerical character.

Numerous related methods, systems, and articles are also disclosed.

These and many other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

FIG. 1 is a front view of a smart phone or similar handheld device capable of running the software;

FIG. 2 is a front view of a tablet device capable of running the software;

FIG. 3 is a perspective view of a laptop device capable of running the software;

In the figures, like reference numerals designate like elements.

DETAILED DESCRIPTION OF ILLUSTRATIVE EMBODIMENTS

Figure 4:
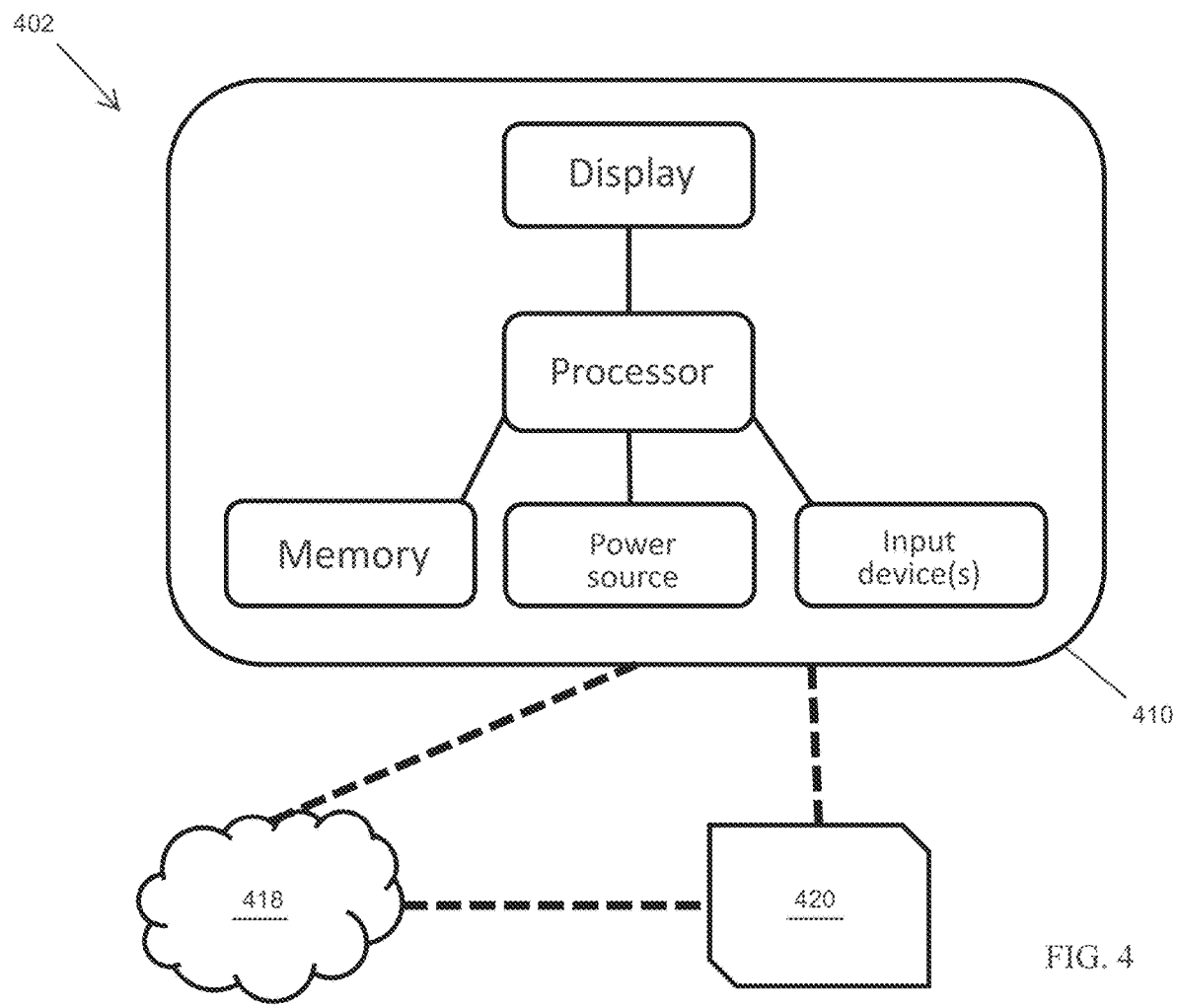
FIG. 4 is a block diagram showing a system that includes an electronic device and selected subsystems thereof, and software in the form of instructions that can be loaded onto the electronic device.

As stated above, we have invented new tools and techniques that can be used to help users navigate through different levels of a hierarchical software program. Some of the examples discussed below are shown in the context of software geared for use in drawing, animation, or both. However, the inventive techniques can be used in other types of software as well.

We disclose a number of different software features in the description that follows. If desired, all such features can be incorporated into a single software program, such as an application or "app" that can be loaded and used on a smart phone, tablet, laptop computer, or other mobile or portable electronic device. In other cases, however, only some, or even only one, of the disclosed software features may be incorporated into a given software program.

Representative portable electronic devices on which the disclosed software can be used are shown in FIGS. 1, 2, and 3. FIG. 1 is a front view of a smart phone 110. The smart phone 110 includes a display screen 112, a touch screen 114, one or more physical buttons 116, and other input and output components such as microphones, cameras, speakers, antennas, and electronic connectors, as well as optional external components connected wirelessly or by wired connections such as physical keyboards, track balls, joysticks, eye-tracking devices, and auxiliary display screens. The touch screen 114 is typically substantially coextensive with the display screen 112. FIG. 2 is a front view of a tablet computer 210. Like the smart phone 110, the tablet 210 includes a display screen 212, a touch screen 214, one or more physical buttons 216, and other input and output components, as discussed. The touch screen 214 is typically substantially coextensive with the display screen 212. Although the screen 212 is larger than the screen 112, both of these display screens have relatively small characteristic dimensions as discussed above, e.g., in a range from 4 to 8 inches. In this regard, it is important that software running on such small devices make efficient use of the limited display area available.

The device of FIG. 3 is a laptop computer 310. The computer 310 includes: a display screen 312; various user input mechanisms such as a physical keyboard 314a, a mouse 314b, and a track pad 314c; and other input and output components such as those discussed above.

Each device 110, 210, 310 includes a display on which the graphical user interface (GUI) of the software can be shown. Each device also includes input mechanisms that allow the user to enter information, such as make selections, enter alphanumeric data, trace freeform drawings, and so forth. In the case of the smart phone 110 and tablet 210, the primary input mechanism is the touch screen, although the laptop 310 may of course also include a touch screen. The graphical user interface (GUI) provided by the software may be designed to display virtual buttons on the output screen, which the user may selectively activate or trigger by touching the touch screen at the location of the desired virtual button with a finger or pen, or by moving a cursor to that location with a mouse or track pad and selecting with a "click".

In this regard, a virtual button is like a physical button insofar as both can be user-activated or triggered by touching, pushing, or otherwise selecting, but unlike it insofar as the virtual button has no physical structure apart from the display screen, and its position, size, shape, and appearance are provided only by a graphical depiction on the screen. A virtual button may refer to a bounded portion of a display screen that, when activated or triggered, such as by a mouse click or a touch on a touch screen, causes the software to take a specific, defined action such as opening, closing, saving, or modifying a given task or window. A virtual button may include a graphic image that includes a closed boundary feature, such as a circle, rectangle, or other polygon, that defines the specific area on the display screen which, when touched or clicked, will cause the software to take the specified action. Virtual buttons require none of the physical hardware components associated with mechanical buttons.

The devices 110, 210, 310 all typically include a microprocessor, memory, and input and output means. As such, these devices are all considered to be computers for purposes of this document, and actions and sequences carried out by the software on such devices are considered to be computer-implemented methods. The software disclosed herein can be readily encoded by a person of ordinary skill in the art into a suitable digital language, and implemented in the form of instructions that can be carried out by the microprocessors of the devices 110, 210, and 310. Such instructions can be stored in any suitable computer language or format on a non-transitory storage medium capable of being read by a computer. Such a computer-readable storage medium may be or include, for example, random access memory (RAM), read only memory (ROM), read/write memory, flash memory, magnetic media, optical media, or the like.

In some cases the display screens of devices 110, 210, 310 may all be replaced, or supplemented, with a projected display screen made by projecting a screen image onto a wall or other suitable surface (remote from the electronic device) with a projector module. The projector module may be built into the electronic device, or it may be a peripheral add-on connected to the device by a wired or wireless link. The projector module may also project a virtual image of the display into the user's eyes, e.g., via suitable eyeglass frames or goggles.

The representative devices 110, 210, 310 should not be construed as limiting. The disclosed software and its various features can be run on any number of electronic devices, whether large screen or small screen. Other devices of interest include the category of smart watches, which may have a screen size in the 1 to 2 inch range, or on the order of 1 inch. Still other devices include touch screen TVs, whether large, medium, or small format.

Regardless of the electronic device chosen by the user and its specific capabilities and specifications, the input mechanism(s) allow the user to interact with the software by means of the GUI displayed on the screen, such as by activating or triggering virtual buttons on the display, or drawing a figure or shape by freeform tracing, using a touch screen, touch pad, mouse, or other known input mechanism.

A block diagram of a system 402 that includes an electronic device 410 and software in the form of instructions 420 that can be loaded directly or indirectly onto the electronic device 410 is shown in FIG. 4. The device 410 may for example be any of the devices 110, 210, or 310 discussed above. Selected components or subsystems of the device 410 are also shown, in particular, a processor, memory (including at least RAM and ROM), input device (s), and a display, as well as a power source. These subsystems and their respective functions, as well as other subsystems and components of state-of-the-art portable electronic devices, are well known in the art, and need not be discussed further. The device 410 may also connect to at least one remote device, computer, or host 418 through one or more intermediate networks, such as the internet or world-wide-web, or through a wireless cell phone digital data link, or by other connections, networks, or links now known or later developed. The broken lines in FIG. 4 illustrate that the instructions 420 can be provided to the processor of the device 410, and loaded into the memory of the device 410, either directly, or indirectly by first being loaded into the remote host 418 and then being transferred or copied from the host 418 to the device 410.

The disclosed virtual buttons are of particular utility in software that has a hierarchical or branched task structure. The software may in this regard have at least two, and often many more, tasks that are related to each other by a dependency. As one example of this, consider a first task that uses one or more settings, and a second task that allows the user to change one of those settings. The tasks may be further related in the sense that the second task may be initiated at a time when the first task is open and active (e.g. the microprocessor is engaged in running the first task), and then, upon such initiation, the first task becomes suspended or paused, but not closed, and the second task becomes open and active (e.g., the microprocessor suspends operation of the first task and becomes engaged in running the second task). Each of these tasks typically has a particular GUI associated with it. Consequently, the opening of the second task would thus also involve introducing onto the display screen a new, second GUI associated with the second task (and in some cases the second GUI can completely cover and replace the first GUI as long as the second task is open and running). When the user is finished with the second task, its setting(s) or information may be saved, and the second task is then closed, returning operation of the software back to the first task, whose suspension is removed such that it resumes active status. The tasks are thus configured in a first-in-last-out (FILO) stacked arrangement.

The reader is cautioned that in this section and throughout this document, the terms "first", "second", etc. are used only as reference labels, and they do not necessarily imply anything more unless otherwise indicated. Thus, for example, a "first" task may refer not only to the lowest-level or earliest stack that was opened in a group or stack of open tasks, but may refer to any of the other tasks in such a group.

The software may thus configure a first and second branched task in a plurality of branched tasks such that when the first branched task is active and the second branched task is initiated, the second branched task becomes active and the first branched task becomes suspended, until the second branched task is closed. In cases where the plurality of branched tasks also includes a third branched task, the software may be further configured such that when the first branched task is suspended and the second branched task is active and the third branched task is initiated, the third branched task becomes active, the second branched task becomes suspended until the third branched task is closed, and the first branched task remains suspended until the second branched task is closed. In this scenario, during the period when the third branched task is open and active, the remaining tasks (the first and second branched tasks) are also open but are suspended. Hence, during this period, three branched tasks are simultaneously open, with only one (the third branched task in this case) being designated as active, and the remaining ones (the first and second branched tasks) being suspended or paused. Here again, the branched tasks are configured in a FILO stacked arrangement.

Figure 5:
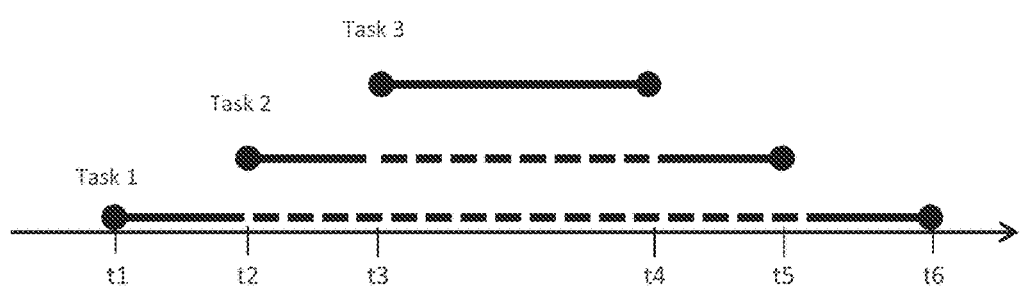
FIG. 5 is a timeline representation of a set of branched tasks.
Figure 6:
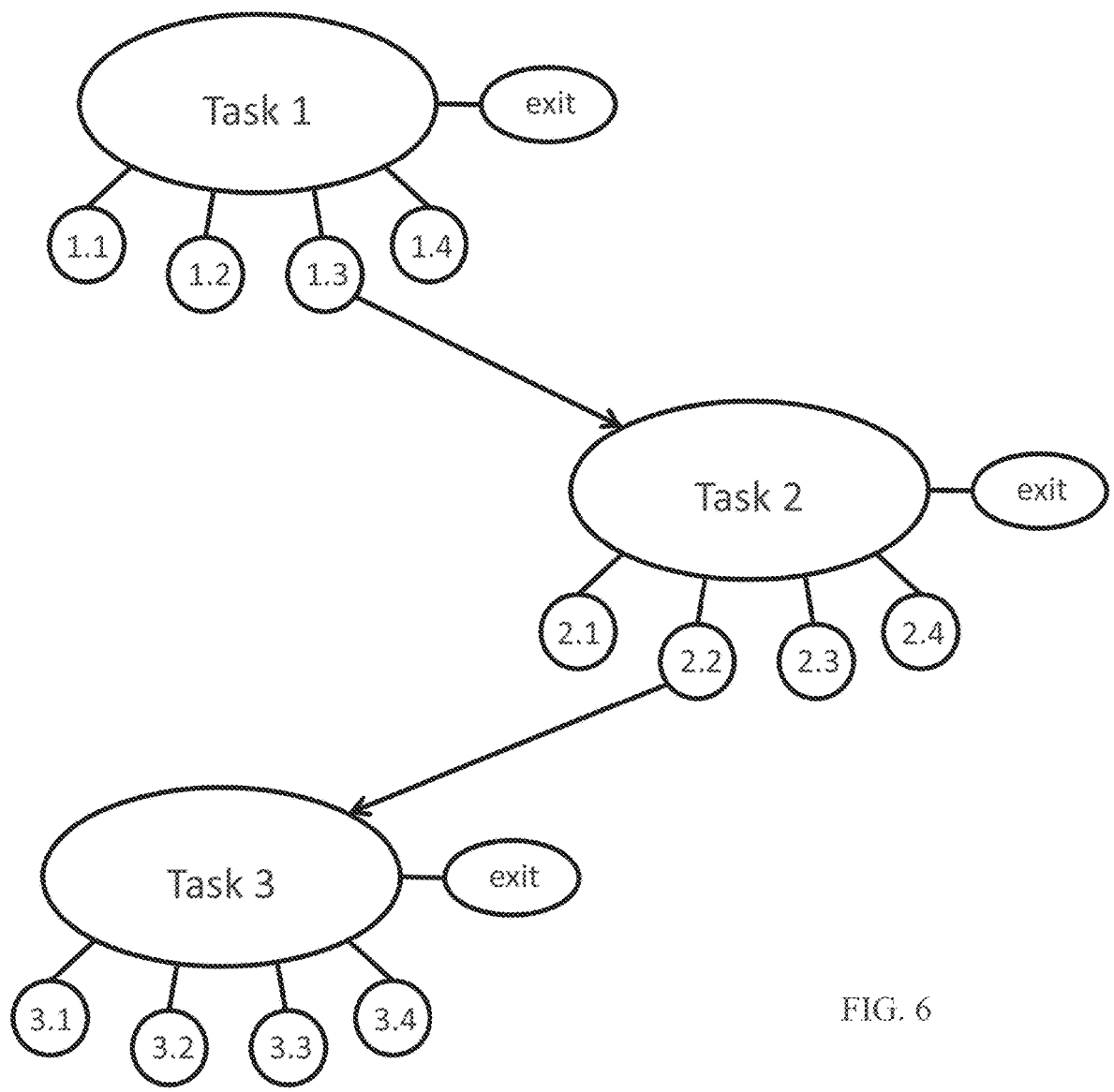
FIG. 6 is a diagrammatic representation of a set of branched tasks.
Figure 7:
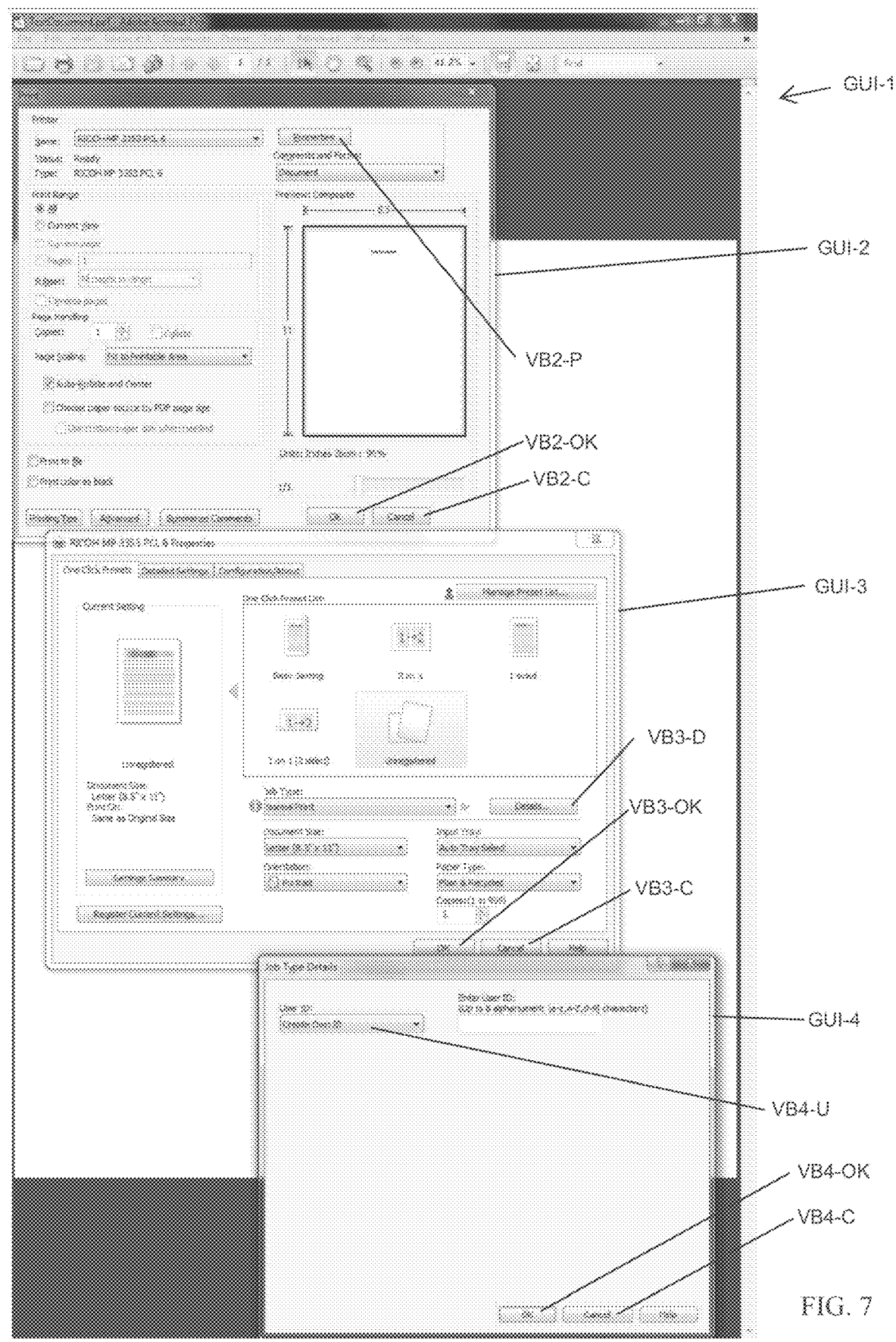
FIG. 7 is a sequence of virtual windows showing how a known or PRIOR ART software program presents branched tasks to a user.

FIGS. 5, 6, and 7 are provided to assist in the explanation of these concepts.

In FIG. 5, a timeline is provided on which are drawn three line segments representing a first, second, and third branched task of a given software program. At time t1, the user opens the first branched task. At time t2, the user opens the second branched task while the first branched task is running. At time t3, the user opens the third branched task while the second branched task is running. At time t4, the user closes the third branched task. At time t5, the user closes the second branched task. At time t6, the user closes the first branched task.

In the period between t1 and t2, as well as in the period between time t5 and t6, only one task (the first branched task) is open and that task is also active, no tasks are suspended, and the GUI displayed on the screen is a first GUI associated with the first branched task. In the period between t2 and t3, as well as in the period between time t4 and t5, two tasks are open, with one (the first branched task) being suspended and one (the second branched task) being active, and the GUI displayed on the screen is a second GUI associated with the second branched task. In the period between t3 and t4, three tasks are open, with two (the first and second branched tasks) being suspended and one (the third branched task) being active, and the GUI displayed on the screen is a third GUI associated with the third branched task. The first, second, and third branched tasks are config- ured in a FILO stacked arrangement. The situation depicted in FIG. 5 can of course be extended to more than three branched tasks, or fewer, e.g., only two branched tasks.

In FIG. 6, an alternative, diagrammatic representation of a set of branched tasks is provided. For purposes of that diagram, we assume operation of the software begins with a first branched task ("Task 1"), and we further assume a first GUI associated with that task is provided on the display screen. By means of the first GUI, while the first task is open, active, and running, the software presents the user with other available tasks, shown in the figure as tasks 1.1, 1.2, 1.3, and 1.4, as well as an exit option. For purposes of the figure, we assume the user chooses to initiate the task 1.3, which we rename as a second branched task ("Task 2"), while the Task 1 is running. With this action, the first branched task becomes suspended or paused (but not closed), the second branched task becomes open and active, and a second GUI associated with the second branched task appears on the display screen. By means of the second GUI, while the second task is open, active, and running (and the first task is open but suspended), the software presents the user with other tasks, shown in the figure as tasks 2.1, 2.2, 2.3, and 2.4, as well as an exit option. For purposes of the figure, we assume the user chooses to initiate the task 2.2, which we rename as a third branched task ("Task 3"), while the Task 2 is running. With this action, the second branched task becomes suspended (but not closed), the first branched task remains suspended, the third branched task becomes open and active, and a third GUI associated with the third branched task appears on the display screen. This process can of course be extended to additional levels or layers of branched tasks.

An example of how a known or PRIOR ART software program presents branched tasks to a user in a sequence of virtual windows is shown in FIG. 7. The images in this figure were obtained on the relatively large screen (greater than 14 inch dimension) of a desktop computer. Here, the software program is commercially available Adobe Acrobat Pro™ software. A first branched task (Task 1) is assumed to be a viewing task in which a first GUI (a virtual window displayed on the computer screen, labeled GUI-1 in the figure) allows the user to view a portable document format (pdf) document. While Task 1 is still running (open and active), the user may choose to print the pdf document being viewed. This choice initiates a second branched task (Task 2), namely, the task of printing the document. Task 2 thus becomes open and active, Task 1 is suspended, and a second GUI (another virtual window, labeled GUI-2 in the figure) is displayed on the computer screen. The GUI-2 includes a number of options, including a virtual "OK" button VB2-OK that the user can select to carry out the printing and close the Task 2 window, as well as other virtual buttons including a virtual "Cancel" button VB2-C and a virtual "Properties" button VB2-P. If the user chooses to select or trigger the VB2-P button, e.g. in order to review or change the print settings, the software initiates a third branched task (Task 3), namely, the task of reviewing print properties. Task 3 thus becomes open and active, Task 2 becomes suspended, and Task 1 remains suspended, and a third GUI (another virtual window, labeled GUI-3 in the figure) is displayed on the computer screen. The GUI-3 includes a number of options, including a virtual "OK" button VB3-OK that the user can select to accept the indicated print settings and close the Task 3 window, as well as other virtual buttons including a virtual "Cancel" button VB3-C and a virtual "Details" button VB3-D. If the user then selects or triggers the VB3-D button, e.g., in order to review or change the job type settings, the software initiates a fourth branched task (Task 4), namely, the task of reviewing the job type details. Task 4 thus becomes open and active, Task 3 becomes suspended, and Tasks 1 and 2 remain suspended, and a fourth GUI (another virtual window, labeled GUI-4 in the figure) is displayed on the computer screen. The GUI-4 includes a number of options, including a virtual "OK" button VB4-OK, a virtual "Cancel" button VB4-C, and a virtual user ID button VB4-U. At this point, the user has navigated to a point in the software where four distinct tasks are simultaneously open and stacked: the viewing task, the printing task, the reviewing print task, and the reviewing job type task. Each branched task has its own virtual window (GUI), and each virtual window has its own virtual buttons, including (at least for tasks 2, 3, and 4) its own virtual "OK" button that can be used to execute the respective task. The various virtual windows shown in FIG. 7 have been arranged for convenience so that most of the task 2, 3, and 4 windows can be seen in the figure.

Figure 8:
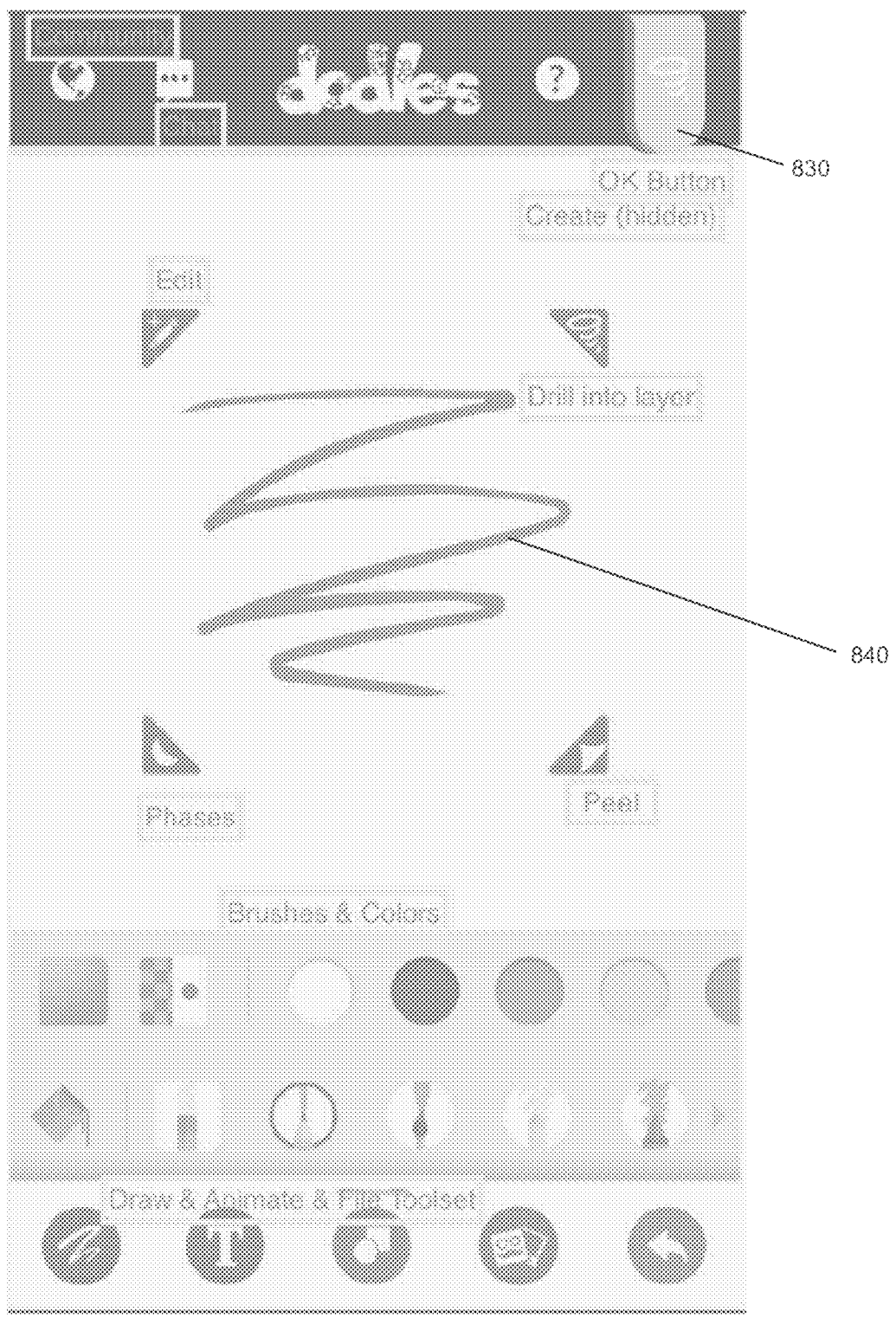
FIG. 8 is a GUI as seen on a display screen for a software program, the GUI including a virtual stack button as disclosed herein.

We turn now to FIG. 8, which shows one possible example of a GUI as seen on a display screen for a given task, e.g., a branched task, of a software program. In this example, the software program pertains to drawing and animation, and we assume the user has drawn an arbitrary object 840, shown as a squiggly line, and has selected the object 840 so that it is framed by a 4-corner menu (Edit, Drill into layer, Peel, and Phases), which is also defined and provided by the software program. The GUI is associated with a particular branched task of the software, which is assumed to be open and active in the view of FIG. 8. The GUI includes many different virtual buttons, including the four triangular-shaped virtual buttons at the corners of the 4-corner menu, numerous virtual buttons in a "Brushes & Colors" zone, more virtual buttons in a "Draw & Animate & File Toolset" zone, and including in particular a virtual stack button 830 as disclosed herein.

The virtual stack button 830, and similar virtual buttons disclosed herein, preferably address the problem or challenge of keeping the user experience as simple and intuitive as possible, even as software programs have become increasingly sophisticated, and complex to navigate. Compounding this problem is the trend towards smaller display screen sizes, discussed above. The more sophisticated the software program, the greater the need to provide features that can simplify navigation and reduce the congestion of options presented to the user within a multiplicity of open tasks that are provided by the software. A user may for example open a first software-provided task, but while still engaged in that first task, need to accomplish a secondary task or subtask. In some cases the first and second tasks may be within the constraints of the same workflow, while in other cases they may have parallel workflows. The first and second tasks may also be branched tasks, as described above.

When the new task is triggered, the software could provide a disruptive "popup" window that is specific to that task, or navigate to a new task window or page. However, new windows located at different regions or spaces of the display screen can make it difficult for the user to return to the original task window cleanly, and the new windows can disrupt the workflow from the standpoint of the user. In known software programs, the user is given little or no indication of where the user is located in the workflow. As shown above in connection with FIG. 7, each open task window or GUI presents options and typically has its own dedicated "exit" and "submit" buttons at different places or locations on the display screen, which the user must adjust to. Each of the tasks also remains active, but suspended or paused awaiting a completion action by the user, such as the "click" or "touch" of a virtual button. The awaited completion action by the user may either (a) execute, affirm, or accept the task, or (b) reject, close, or escape from the task. Upon such user completion action being taken, the software may then close the task and remove the corresponding task window from the display screen, or navigate to the previous task window in a FILO manner.

In contrast to this, the disclosed software preferably configures the virtual stack button 830 to provide a simple visual cue to the user to indicate where in the workflow of a group of related tasks the user is currently located. The virtual stack button may for example include a graphic icon or symbol—preferably, a non-alphanumeric symbol, and preferably not including any standard numerical character—that is located at a predetermined, consistent place on each of a plurality of related task windows. Furthermore, the virtual stack buttons themselves in some, most, or all of the related task windows are preferably located at a given predetermined, consistent place on the display screen, which we may refer to as a minor space on the display. The graphic symbol, if included as part of the virtual stack button, may be associated with the currently open and active task, and may differ from other graphic symbols associated with other tasks. The user may touch, click, or otherwise trigger the virtual stack button 830 to select, accept, and/or close the current task in the current task window. Significantly, the virtual stack button 830 includes a visual feature or indicator that provides information to the user about where the current task window is located in the workflow of the group of open tasks, as discussed further below. This is of particular benefit in cases where the software is being used on a small display screen such as that of a smart phone, since the amount of available space for graphics is so limited.

Spatial relationships between the GUI (e.g. task window), the virtual stack button 830, and the display screen, may be as follows: the GUI as a whole fills a major space on the display screen, and the portion of the GUI represented by the virtual stack button 830 fills a minor space on the display screen. Here, the words "major" and "minor" are used in a relative sense, and the minor space is typically a small portion, or subset, of the major space. The major space on the display screen is preferably the entire active area, or substantially the entire active area, or at least most of the active area, of the display. In this regard, the aspect ratio of the GUI (task window) of FIG. 8 is the same or substantially the same as the aspect ratio of a typical display screen for a smart phone, see e.g. display screen 112 of FIG. 1, thus making it easily suitable to fill the entire active display area of such a device. The virtual stack button 830 is positioned on the GUI, and the GUI is positioned on the display screen, such that the button 830 is located at a specific area on the display screen which we refer to as the minor space of such screen. Desirably, each GUI (task window) of each of the group of tasks has a respective virtual stack button, and all of these virtual stack buttons, as they are displayed one at a time, fill the same, or substantially the same, minor space on the display screen. Examples of the virtual stack buttons filling the same minor space are shown below in at least FIGS. 9A-9D, and FIGS. 21-28, and FIGS. 33A-33E. Examples of the virtual stack buttons filling substantially the same minor space—e.g., where the respective virtual stack buttons fill respective minor spaces that overlap each other such that for any two of the respective minor spaces, one such minor space is encompassed by and underfills another such minor space—are shown below in at least FIGS. 29A-29F, and FIGS. 30A-30F, and FIGS. 31A-31F, and FIGS. 32A-32D.

In the embodiment of FIG. 8, the virtual stack button 830 is situated near the upper right corner of the GUI or task window, and has the overall shape of a rounded tab. In alternative embodiments, the virtual stack button can of course have other shapes, and can be situated at other places within the associated GUI, e.g., upper left corner, lower left corner, lower right corner, lower center, upper center, etc. By positioning the virtual stack buttons at the same place, or substantially the same place, on the display screen, the user can cycle through a stack of tasks relatively easily by, for example, tapping on the same location of a touch screen to trigger, in a FILO sequence, the corresponding stack of virtual stack buttons.

Turning now to FIGS. 9A-9D, we see there portions of GUIs as seen on a display screen, the portions including virtual stack buttons at various stages of operation of the software. Only a small portion of the entire GUI—specifically, a small portion at the upper right corner of the GUI, as can be seen by comparison with the full GUI of FIG. 8—is shown so that the virtual stack button can be enlarged and seen more easily. In these figures, the virtual stack buttons all have one type of visual indicator that informs the user of how many branched tasks are open. In this example, the visual indicator includes one or more bar-shaped elements provided in the graphic design of the virtual stack button. Preferably, the presence of more bar-shaped elements indicates more open tasks, and the presence of fewer bar-shaped elements indicates fewer open tasks. In some cases, where the number of bar-shaped elements is M, and where the number of open tasks is N, M may be equal to N. In some cases, due to limitations on how many bar-shaped elements can be included in the virtual stack button, M may equal N up to a value of M max, and for values of N>M max, M may remain at M max, where M max may have a value of 4, 5, or 6, for example, and may depend on the actual size and shape of the virtual stack button, and the size chosen for the bar-shaped elements. Alternatively, each bar-shaped element may represent up to a given integer number of open tasks, e.g., up to 3 tasks, such that if only one task is open then only one bar-shaped element is shown, and if three tasks are open then still only one bar-shaped element is shown, and if five tasks are open then two bar-shaped elements are shown, and if eight tasks are open then three bar-shaped elements are shown, and so forth.

Figure 9A:
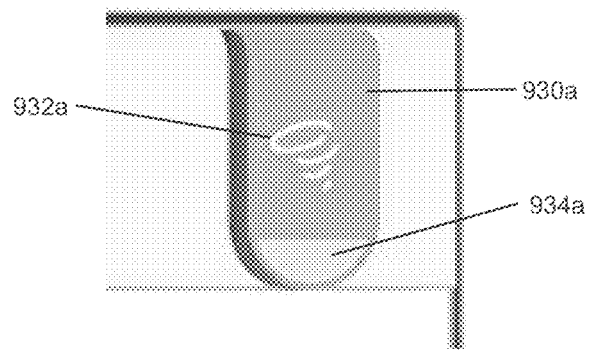
FIGS. 9A-9D are portions of GUIs as seen on a display screen, the portions including virtual stack buttons at various stages of operation of the software, these virtual stack buttons having one type of visual indicator that indicates how many branched tasks are open.

Thus, in FIG. 9A, a portion of a first GUI for a first branched task, in a stack of N open tasks, includes a first virtual stack button 930a. The button 930a has an overall shape or boundary of a rounded tab, like the button 830 of FIG. 8. Only a single bar-shaped element 934a is included in the graphic design of the button 930a. Depending upon the configuration of the software, this may mean that there is only one open task (namely, the first branched task) in the stack of open tasks, i.e., that N=1, or it may have other meanings as discussed above generally indicative of a relatively small number of open tasks. As another simple visual cue to the user, the button 930a also includes an optional first non-alphanumeric symbol 932a associated with the first branched task. In the figure, a tornado-like symbol is depicted, which may be associated with a "drilling" task for animation software to allow the user to drill down into various different graphical layers of an object or character, for example.

Figure 9B:
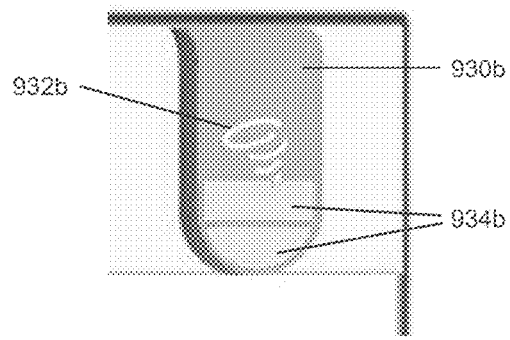

FIG. 9B is similar to FIG. 9A. In FIG. 9B, a portion of a second GUI for a second branched task, in a stack of N open tasks, includes a second virtual stack button 930b. The button has the same overall shape as button 930a, and preferably occupies the same minor space on the display screen. Two bar-shaped elements 934b are included in the graphic design of the button 930b. This may mean that there are only two open tasks (e.g. the second branched task and a (suspended) first branched task) in the stack of open tasks, i.e., that N=2, or it may have other meanings as discussed above generally indicative of a relatively greater number of open tasks than in FIG. 9A. The button 930b also includes an optional second non-alphanumeric symbol 932b associated with the second branched task. In the figure, a tornado-like symbol is again depicted, which may be associated with another "drilling" task.

Figure 9C:
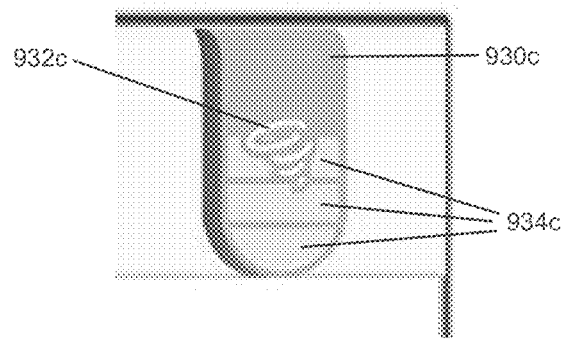

FIG. 9C is similar to FIGS. 9A and 9B. In FIG. 9C, a portion of a third GUI for a third branched task, in a stack of N open tasks, includes a third virtual stack button 930c. The button has the same overall shape as buttons 930a, 930b, and preferably occupies the same minor space on the display screen. Three bar-shaped elements 934c are included in the graphic design of the button 930c. This may mean that there are three open tasks (e.g. the third branched task and (suspended) first and second branched tasks) in the stack of open tasks, i.e., that N=3, or it may have other meanings as discussed above generally indicative of a relatively greater number of open tasks than in FIGS. 9A and 9B. The reader will note with reference to FIGS. 9C and 9B that when multiple bar-shaped elements are included in the virtual stack button, the bar-shaped elements need not be identical to each other, although in alternative embodiments some or all of such elements may be identical. Like buttons 930a, 930b, the button 930c also includes an optional third non-alphanumeric symbol 932c associated with the third branched task. In the figure, a tornado-like symbol is again depicted, which may be associated with still another "drilling" task.

Figure 9D:
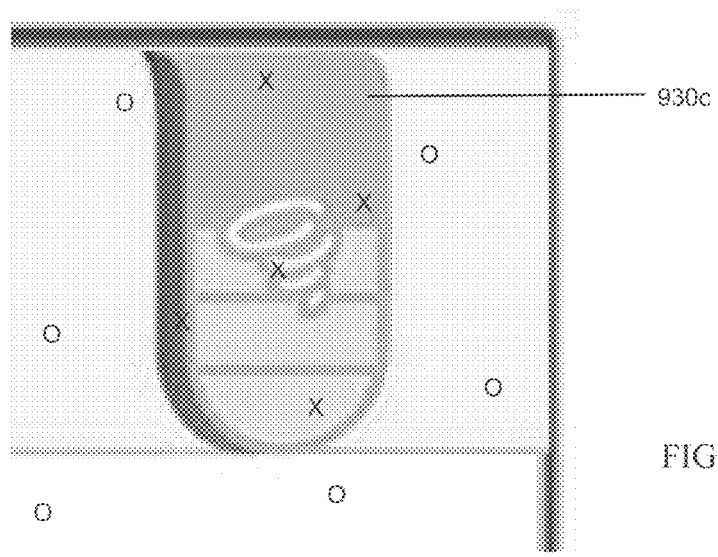

FIG. 9D simply repeats the view of the virtual stack button 930c of FIG. 9C, but the view of FIG. 9D is enlarged so that more aspects of the virtual stack button can be discussed. In FIG. 9D, small X symbols and small O symbols are provided to represent different possible locations at which a user may "touch", e.g. with a finger on a touch screen, or "click", e.g. with a computer mouse, the display screen and thus the GUI. The software interprets a touch at any of the X locations as a selection of or triggering of, the button 930c, whereas a touch at any of the O locations is not so interpreted. This illustrates that the button 930c operates as a single virtual button, even when it includes within its boundaries various distinct graphical features, such as the bar-shaped elements 934c and the non-alphanumeric symbol 932c (see FIG. 9C).

FIGS. 10 through 18 show more possible embodiments of virtual stack buttons as disclosed herein. All of these figures depict a small portion of a given GUI or task window associated with a given branched task in a stack of N open tasks, the small portion located at an upper right corner and including the virtual stack button.

Figure 10:
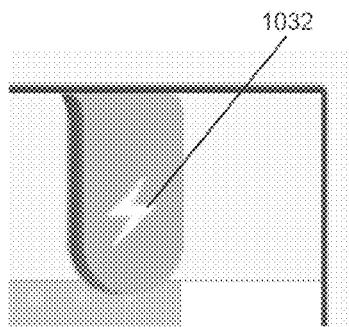
FIGS. 10-12 are portions of GUIs that include virtual stack buttons, the virtual stack buttons including different non-alphanumeric symbols associated with different software tasks.
Figure 11:
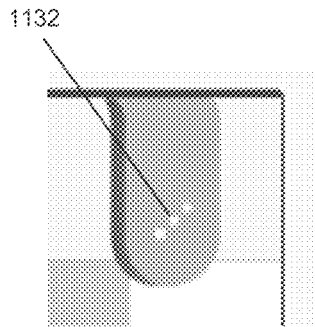
Figure 12:
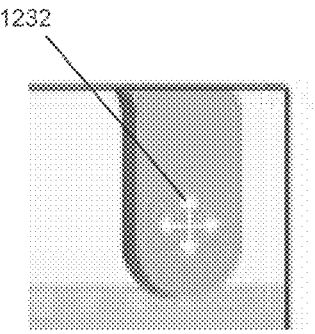

FIGS. 10-12 are included to show alternative non-alphanumeric symbols that may be included in the virtual stack button, and that may be associated with different software tasks. In FIG. 10, a virtual stack button includes a non-alphanumeric symbol 1032 associated with the active branched task in the stack. In the figure, a lightning-like symbol is depicted, which may be associated with an "effects" task for animation software to allow the user to access and close a list of effects, for example. In FIG. 11, a virtual stack button includes a non-alphanumeric symbol 1132 associated with the active branched task in the stack. In the figure, a slanted group of three dots is depicted, which may be associated with an "options" task for animation software to allow the user to access a list of tools to edit an object, for example. In FIG. 12, a virtual stack button includes a non-alphanumeric symbol 1232 associated with the active branched task in the stack. In the figure, a crossed set of double-headed arrows is depicted, which may be associated with a "move" task for animation software to allow the user to specify or define one or more motions for a given object or character, for example.

Figure 13:
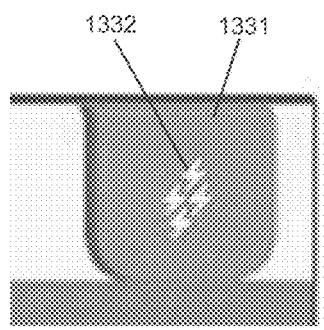
FIGS. 13 and 14 are portions of GUIs that include another type of virtual stack button.
Figure 14:
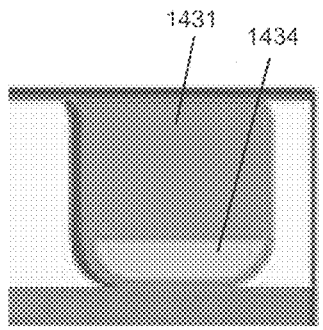

FIGS. 13 and 14 are included to show alternative virtual stack button embodiments, as well as an alternative non-alphanumeric symbol. In FIG. 13, a virtual stack button 1331 is provided that has a different shape than the virtual buttons of FIGS. 9A through 12. Specifically, the virtual button 1331 is wider than the other cited buttons, and the button 1331 may also have a different color, for example, the button 1331 may be blue while the other cited buttons may be green, or vice versa. If desired, the widened shape of the button 1331 may be applied to any or all of the prior embodiments without any further changes in function.

The button 1331 also includes a non-alphanumeric symbol 1332 associated with the active branched task in the stack. In the figure, an array of four small lightning-like symbols is depicted, which may be associated with a "master effects" task for animation software to allow the user to define or specify an effect for a character or object using two or more previously defined effects, for example. In FIG. 14, a virtual stack button 1431 similar to button 1331 is shown. The button 1431 however omits the non-alphanumeric symbol, and it includes one bar-shaped element 1434 as an indicator that one branched task is (or a small number of branched tasks are) open in the stack of tasks.

Figure 15:
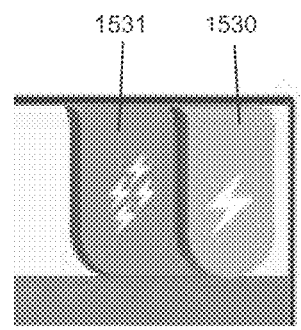
FIGS. 15 and 16 are portions of GUIs that include combinations of the first and second type of virtual stack button.
Figure 16:
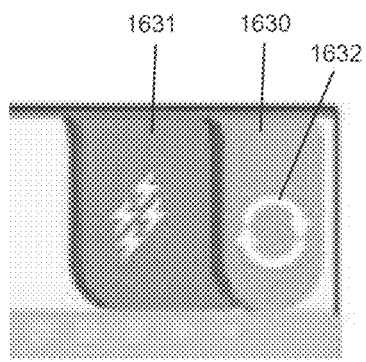

FIGS. 15 and 16 are included to show embodiments in which the two different types of virtual stack buttons are used on the same active GUI or task window. Thus, in FIG. 15, a given branched task is active and its associated GUI is displayed on the screen, and the GUI includes a relatively wide virtual stack button 1531 like those of FIGS. 13 and 14, as well as a relatively narrow virtual stack button 1530 like those of FIGS. 9A through 12. The buttons 1530, 1531 are preferably configured to be used with different types of software tasks that the user can navigate independent of each other, such that one of the buttons provides a visual indicator of how many branched tasks of one type are open, and the other button provides a visual indicator of how many branched tasks of the other type are open. As shown, the buttons can also include respective non-alphanumeric symbols to inform the user what task of that type is currently active. In FIG. 16, a GUI includes a set of two virtual stack buttons 1631, 1630 in similar fashion to FIG. 15. The button 1630 includes a non-alphanumeric symbol 1632 associated with an active task. In the figure, a circle with two arrowheads is depicted, which may be associated with a "rotate" task for animation software to allow the user to specify or define one or more rotational motions for a given object or character, for example.

In other cases, the wider virtual stack button may be employed by the software to represent a second type of task stack that can be manipulated and navigated independently of a first task stack represented by the narrower virtual stack buttons described previously. For example, the wider virtual stack button may be used for software tasks relating to the timing of effects, and the ability to access and navigate to other effects within those effects, whereas the narrower virtual stack button may be used for software tasks relating to manipulation of a physical part within the character group by use of the Drill function described below, or by use of another suitable function. By use of these conjoined stacks, the user may first navigate to an effect that is grouped within another set of effects, and then manipulate a physical feature of a character that is grouped within a character set. Each virtual stack button would thus represent, and keep track of, its own stack of tasks. In some embodiments, the wider stack may act as a superset of tasks, such that activating the wider virtual button would optionally close out the entire stack of subordinate tasks within the narrower stack. The technique of using more than one virtual stack button on a given GUI or task window (e.g. using one wide button and one narrow button) may be extended to K such virtual buttons, where K is an integer not limited to 2, but may be 3, or 4, or more, where each additional virtual stack button results in an even larger underlying button than the prior one. Activation by the user of the lowest level virtual stack button, or for that matter of any other one of the virtual stack buttons, may have the function of closing out all tasks located above it.

In other cases, a second virtual stack button, or in general, K virtual stack buttons, may be positioned independently without overlapping. In some embodiments, the user may drill into one character to access a body part and then locate another character to also drill into to move the part or parts from one position within one character to another position within another, as an example.

Figure 17:
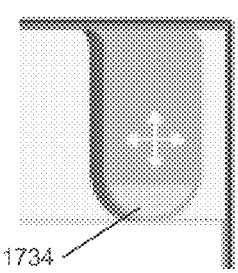
FIGS. 17 and 18 are portions of GUIs that include additional examples of virtual stack buttons.
Figure 18:
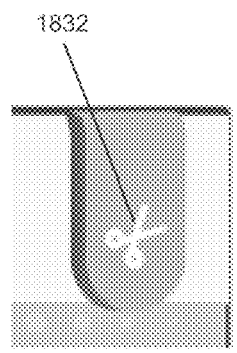

FIGS. 17 and 18 are included to show still more embodiments of exemplary virtual stack buttons. FIG. 17 shows such a button similar to that of FIG. 12, but where a single bar-shaped element 1734 is included as a visual indicator of the number of open tasks. FIG. 18 shows a virtual stack button having a non-alphanumeric symbol 1832 associated with an active task. In the figure, a drawing of a scissors is depicted, which may be associated with a "trim" task for animation software to allow the user to trim a time segment for an animation of a given object or character, for example.

A sequence of GUIs that illustrate the evolution of a virtual stack button during a user session involving a set of branched animation tasks are shown in FIGS. 19-28. The GUI shown in each of these figures has an aspect ratio similar to that of a smart phone, and is intended to completely fill the display screen of such a device.

Figure 19:
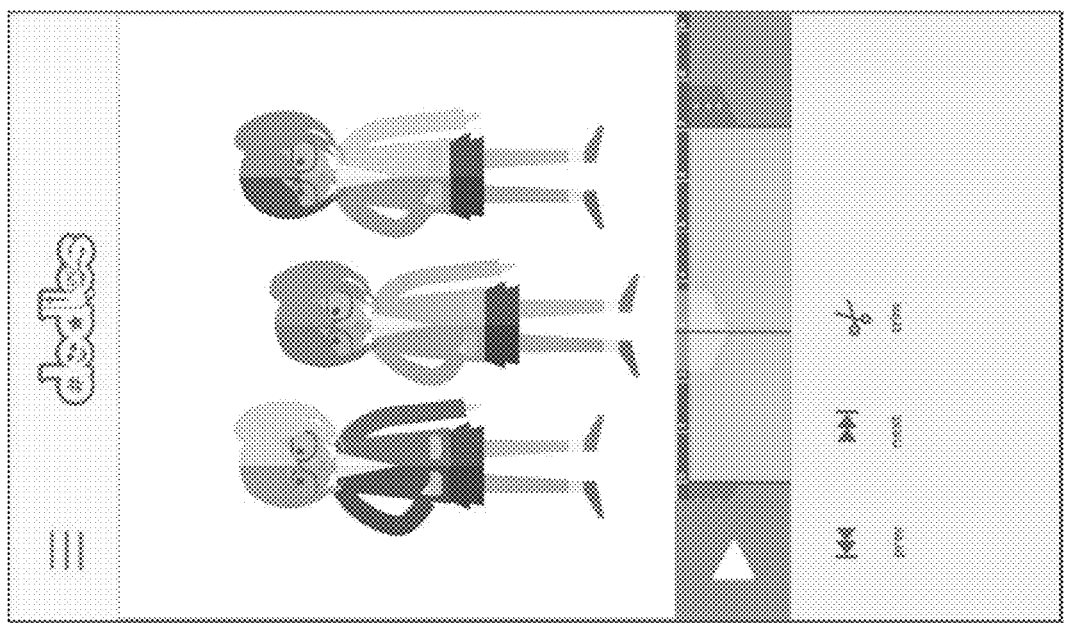

FIG. 19 represents a neutral or idle state. Here, a group of unselected characters is visible on the display screen. There is no task running that would require the user to exit or close, thus, the GUI does not have any virtual stack button. In an alternative embodiment, a virtual stack button could be shown but in a "faded" state to indicate it is not available for selection or triggering.

Figure 20:
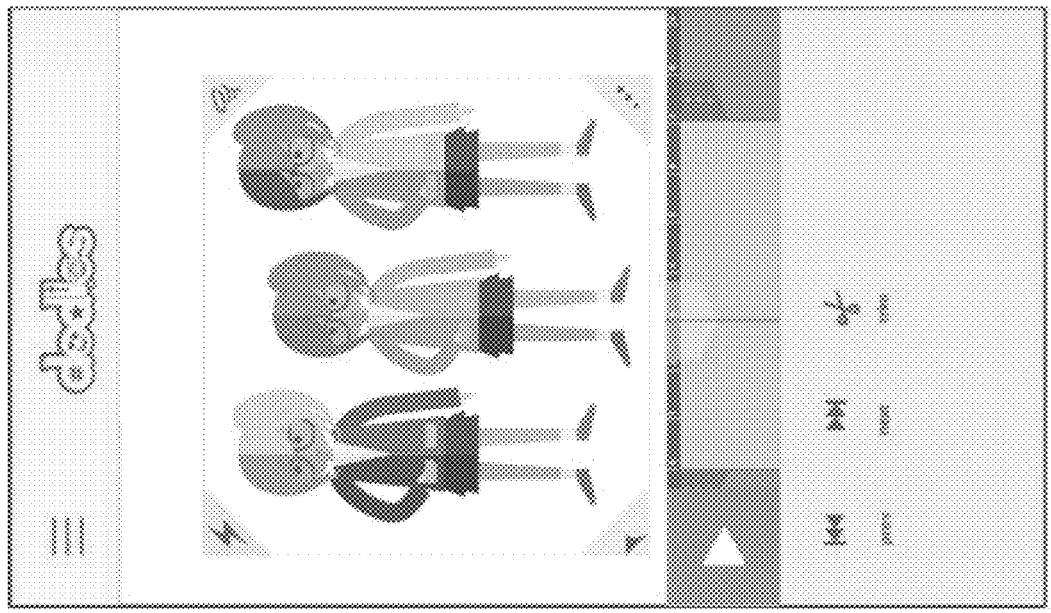
FIGS. 19-28 are a sequence of GUIs illustrating the evolution of a virtual stack button during a user session involving a set of branched tasks in the context of animation software.

A user touch, tap, or click at any point within the group of characters is interpreted by the software as a selection of all of the characters, assuming the user had previously grouped the characters together as a single unit. The selection causes the 4-corner menu to appear as a bounding box to the group of characters, as shown in FIG. 20. In the embodiment shown, at this point, a virtual stack button is not yet included in the GUI. Alternatively, a virtual stack button could be included at this point, and the user could de-select the selected object (the group of characters) by triggering the virtual stack button.

A first "drill" task is then opened and activated by a user touch on the Drill icon in the upper right corner of the 4-corner menu. The purpose of this task is to, so to speak, drill below the surface of the character group in order to break the individual characters apart from each other so the user can isolate and access a single one of the characters.

Figure 22:
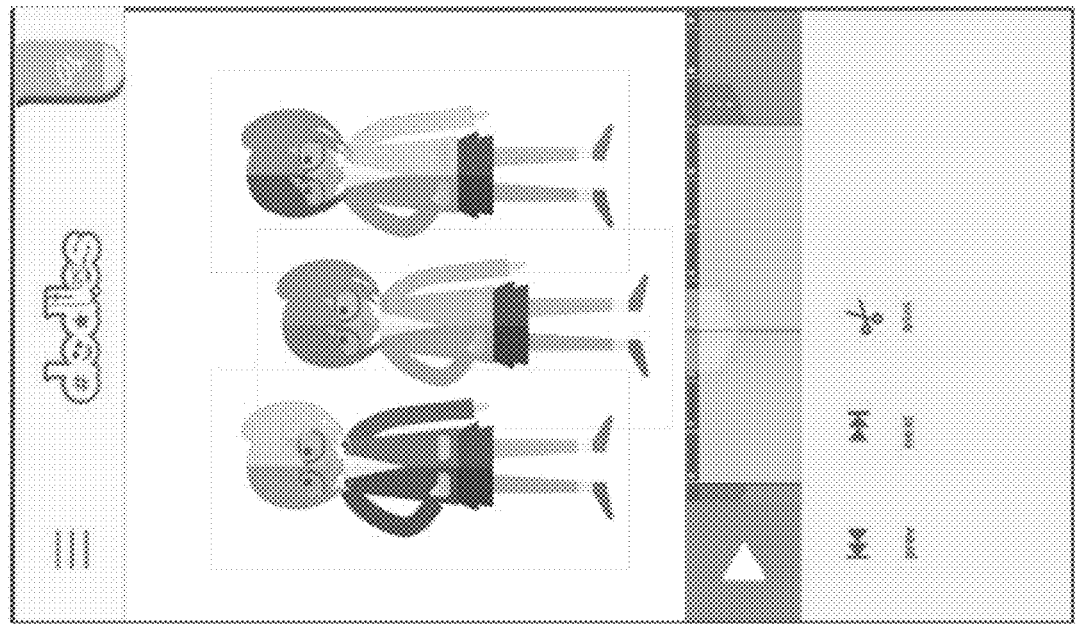
Figure 21:
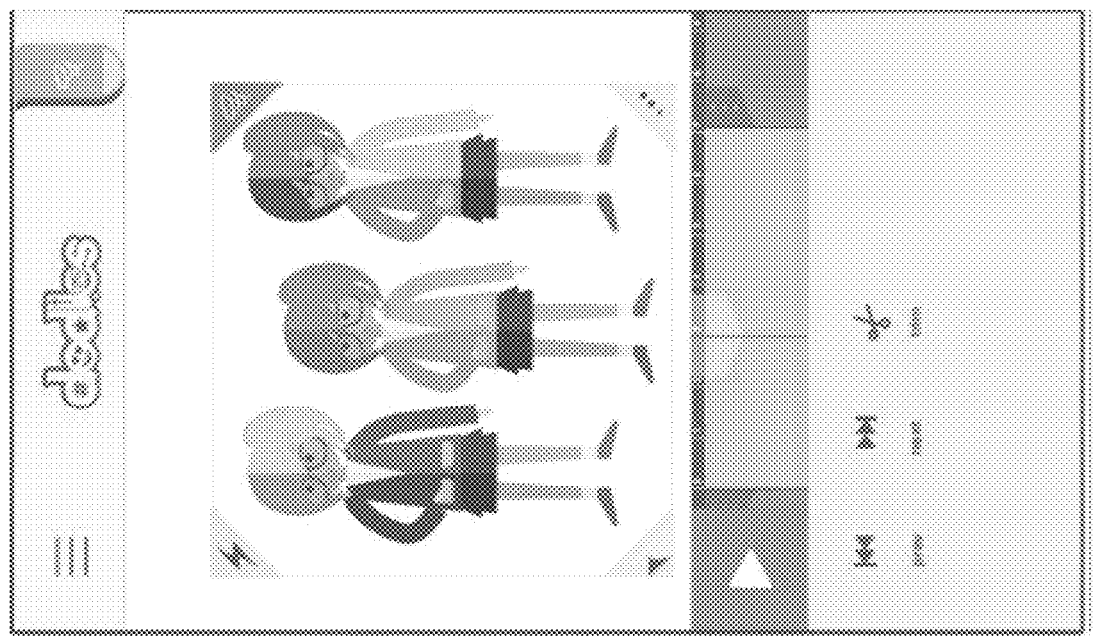

This user action instantiates the virtual stack button, i.e., causes the virtual stack button to appear on the screen as part of the GUI, and the Drill icon becomes highlighted, as shown in FIG. 21. The virtual stack button in this figure is the same as that shown in FIG. 9A. The button includes only one bar-shaped element (see element 934a in FIG. 9A), because only one branched task—the first drill task—is open. Stated differently, N=1. The button includes a tornado-shaped graphic image (see symbol 932a in FIG. 9A) to remind the user the currently active task is a drill task. If the user wished to exit this first drill task at this stage, they would touch, click, or otherwise trigger the virtual stack button, which would close the task and return operation to the status of FIG. 20. As such, the virtual stack button would be removed from the screen, and the Drill icon on the 4-corner menu would no longer be highlighted. Instead of exiting, the user can remain engaged with the first drill task, as shown in FIG. 22. The GUI at this point continues to display the virtual stack button seen more clearly in FIG. 9A. Since the user has drilled into the group of characters, the individual characters become directly accessible.

Figure 23:
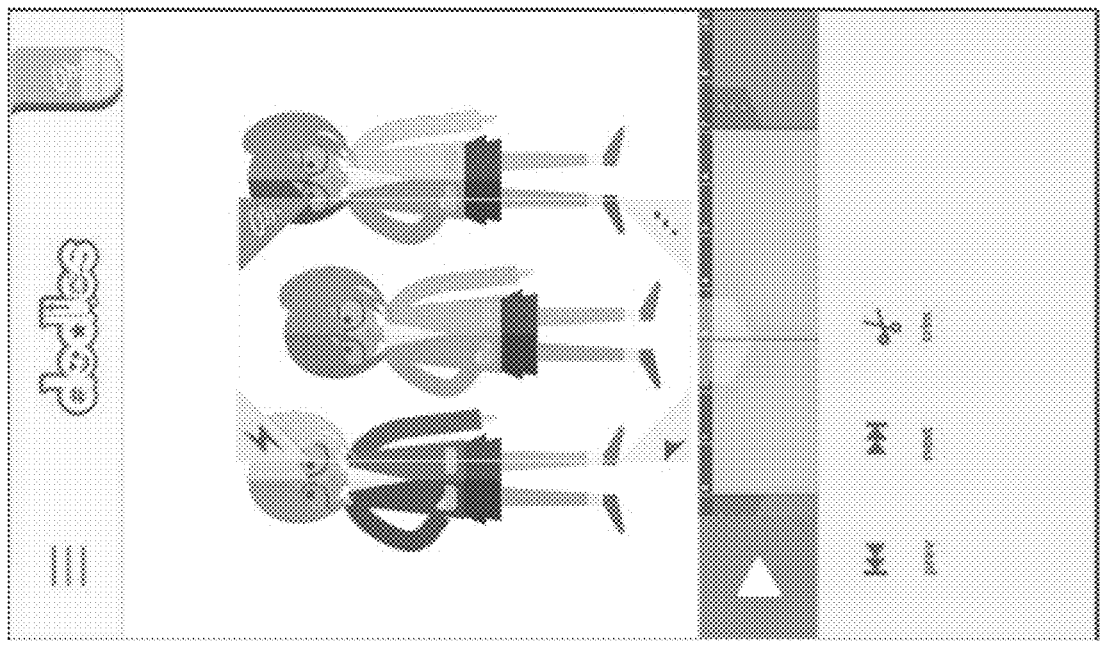

The user may then choose or select one of the characters by touching, clicking, or otherwise selecting the character, as shown in FIG. 23. In that figure, the user has selected the character in the middle of the group, and by doing so, a new 4-corner menu appears that frames the selected character.

Figure 24:
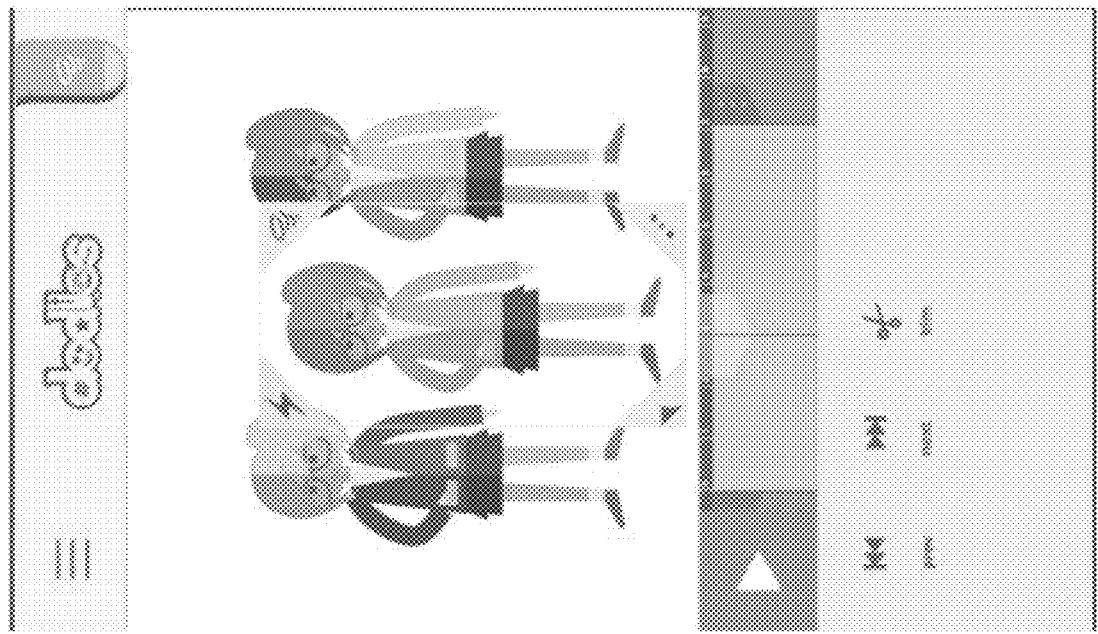

The selected character is itself made up of a group of defined parts, such as a head, torso, legs, and so forth. If the user wishes to investigate or modify only one of these parts, they can do so by a second "drill" task, which drills below the surface, so to speak, of the selected character in order to break the individual parts apart from each other so the user can isolate and access a single one of the parts. The second drill task is opened and activated by a user touch on the drill icon in the upper right corner of the 4-corner menu of FIG. 23. This user action pauses or suspends the (still open) first drill task, and replaces the virtual stack button of FIG. 23 with another virtual stack button at the same location on the screen, and causes the Drill icon to become highlighted, as shown in FIG. 24. The virtual stack button in this figure is the same as that shown in FIG. 9B. The button has two bar-shaped elements (see elements 934b in FIG. 9B), because two branched tasks—the first drill task (currently suspended) and the second drill task—are open. Stated differently, N=2. The button again includes a tornado-shaped graphic image (see symbol 932b in FIG. 9A) to remind the user the currently active task is a drill task. (If the user had instead launched an "effects" task as the second task, the tornado symbol 932b on the virtual stack button would instead be a lightning bolt symbol 1032 as seen in FIG. 10.) If the user wished to exit this second drill task at this stage, they would touch, click, or otherwise trigger the virtual stack button, which would close the task and return operation to the status of FIG. 23. As such, the virtual stack button would be replaced by the virtual stack button of FIG. 9A, and the Drill icon on the 4-corner menu would no longer be highlighted.

Figure 25:
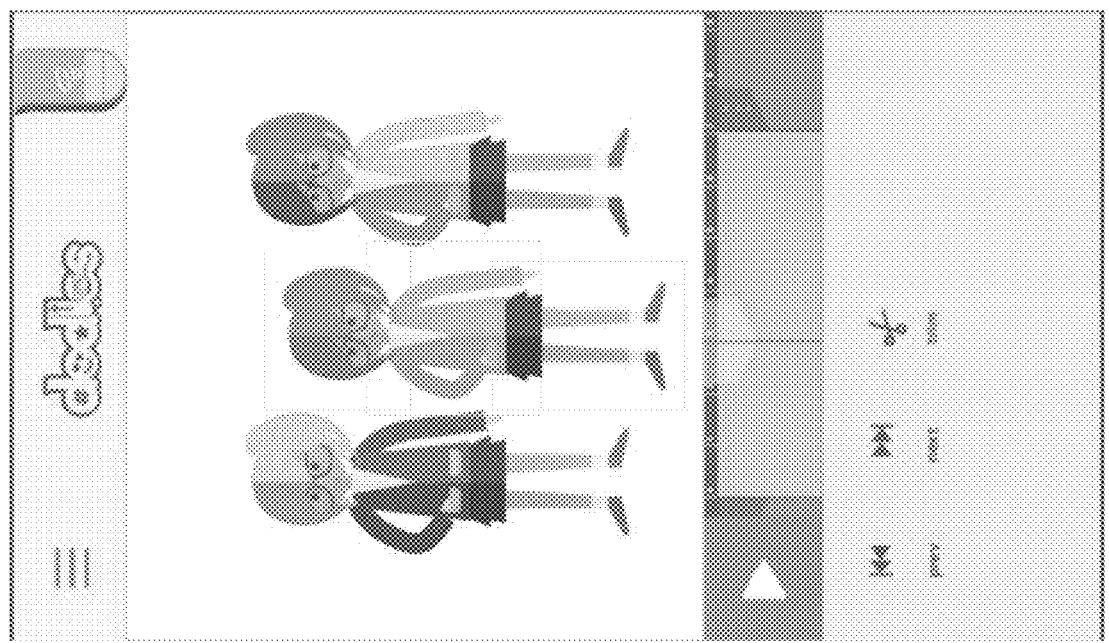
Figure 28:
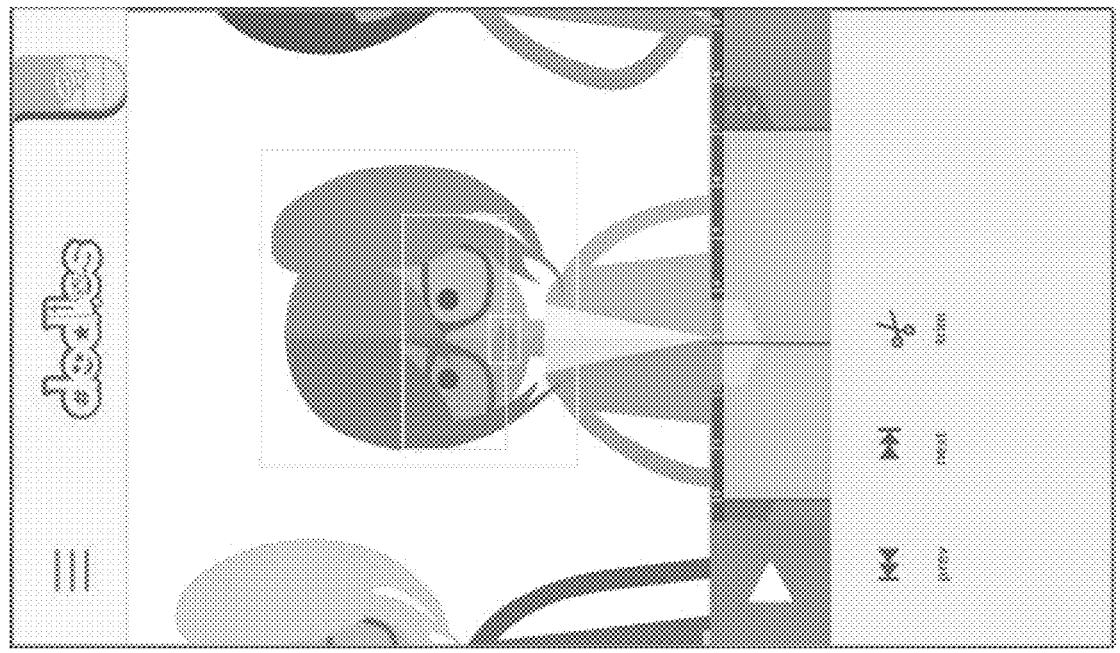

Instead of exiting, the user can remain engaged with the second drill task (while the first drill task is suspended but open), as shown in FIG. 25. The GUI at this point continues to display the virtual stack button seen more clearly in FIG. 9B. Since the user has drilled into the group of characters, and has selected and further drilled into the central character, the individual parts of that character become directly accessible.

Figure 26:
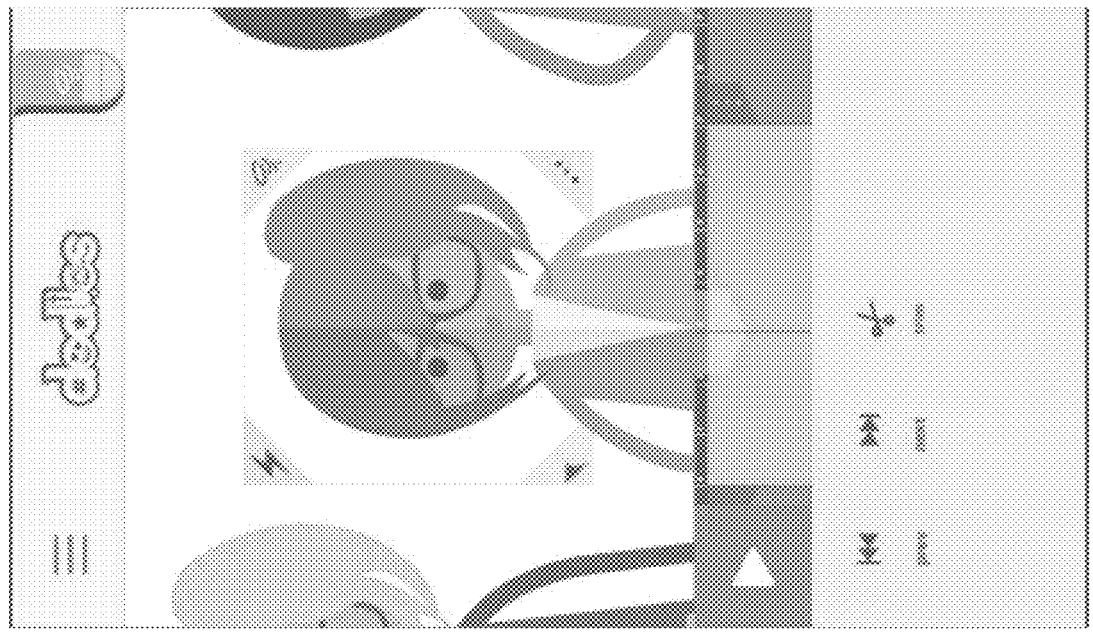

The user may then choose or select one of the character parts by touching, clicking, or otherwise selecting the part, as shown in FIG. 26. In that figure, the user has selected the part which is the head of the middle character, and by doing so, a new 4-corner menu appears that frames the selected head. Since the selected part is small, the software is configured to zoom in automatically, as shown in FIG. 26.

Figure 27:
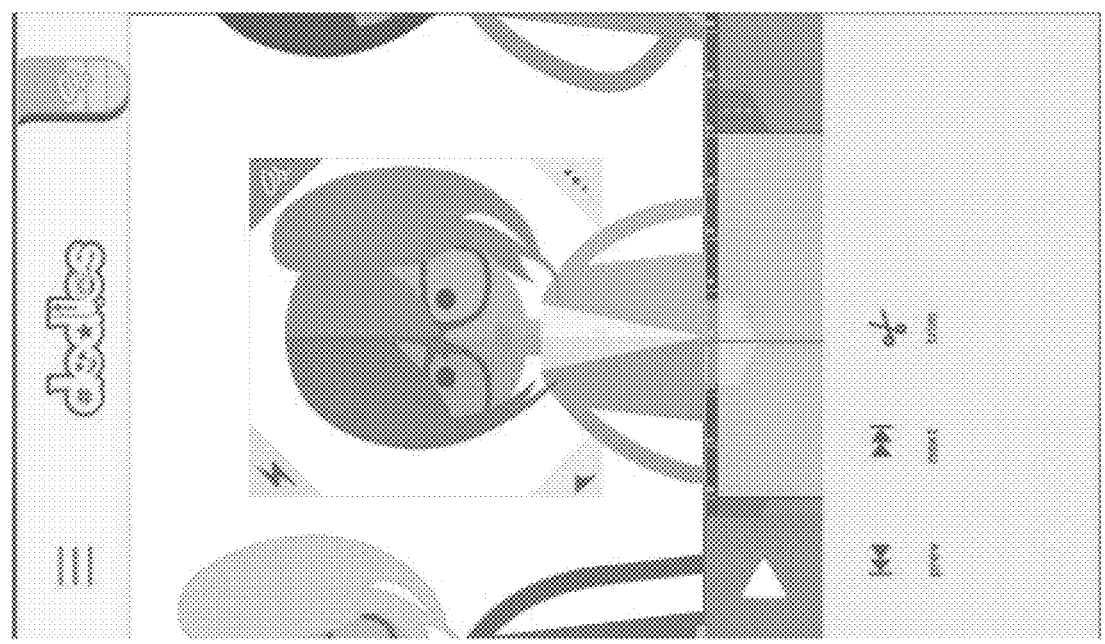
Figure 29A:
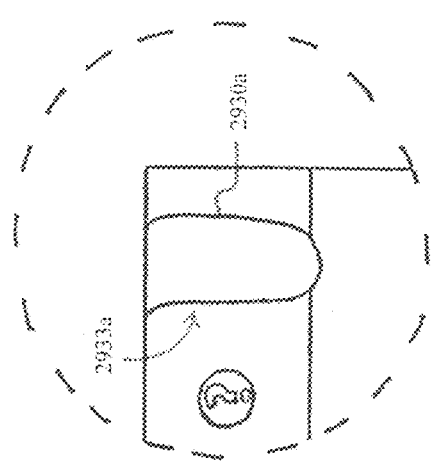
FIGS. 29A-29F are portions of GUIs showing examples of alternative virtual stack buttons with a different type of visual indicator.
Figure 29B:
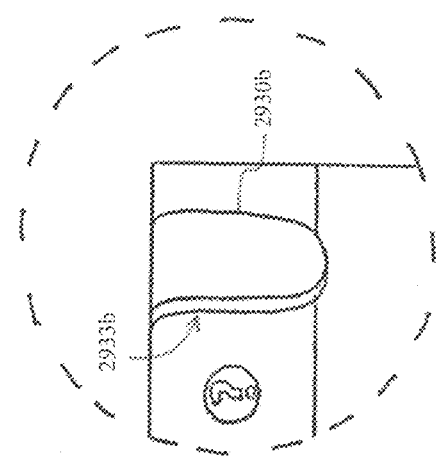
Figure 29C:
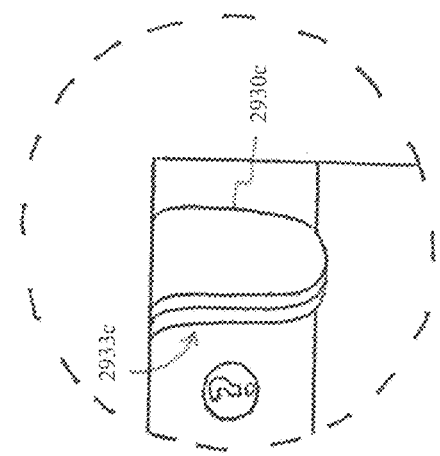
Figure 29D:
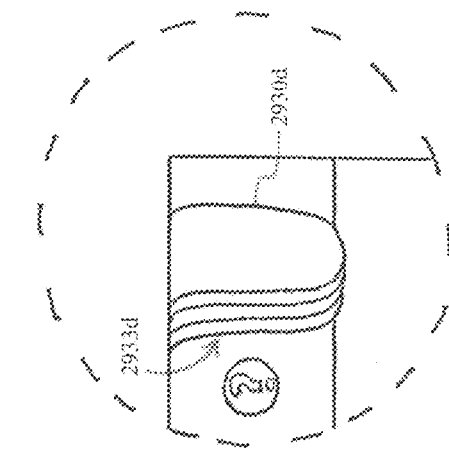
Figure 29E:
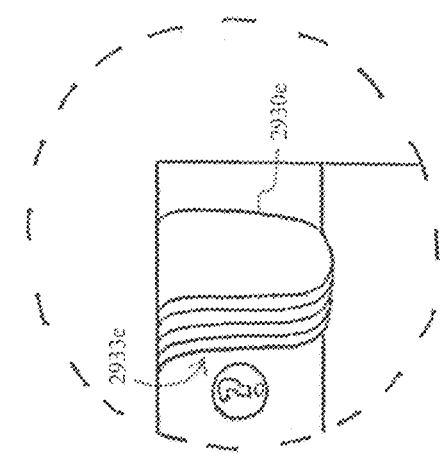
Figure 29F:
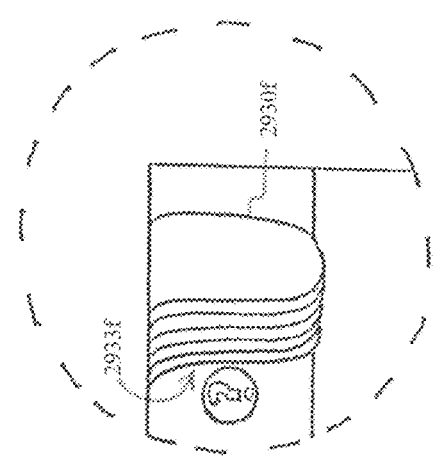
Figure 30B:
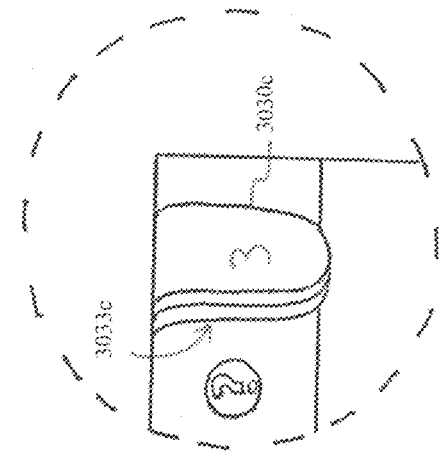
FIGS. 30A-30F are portions of GUIs showing examples of alternative virtual stack buttons with still another type of visual indicator.
Figure 30E:
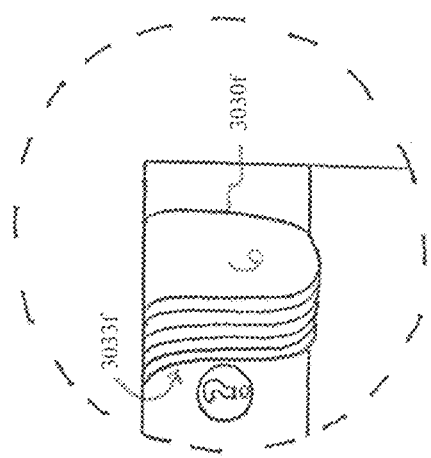
Figure 30A:
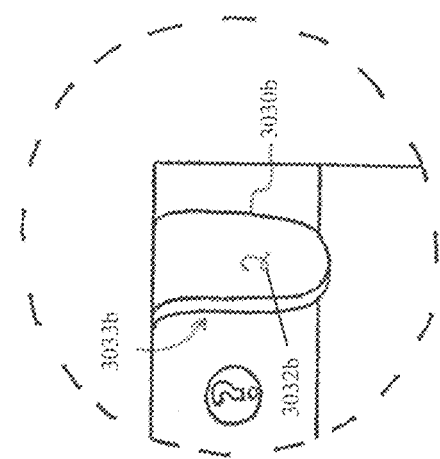
Figure 30D:
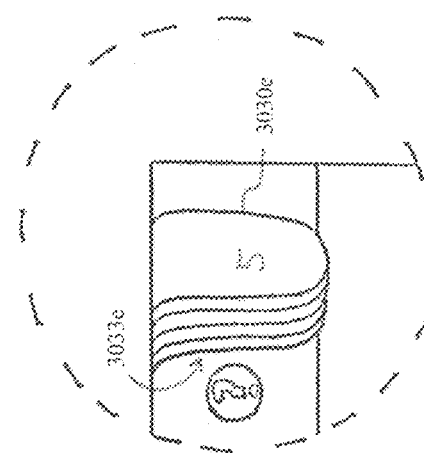
Figure 30C:
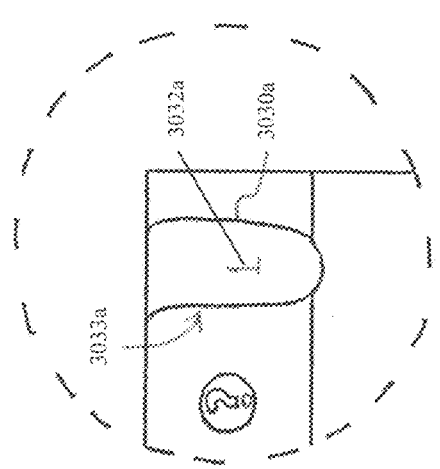
Figure 30F:
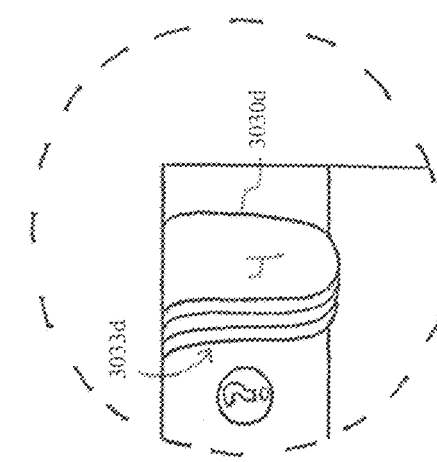
Figure 31A:
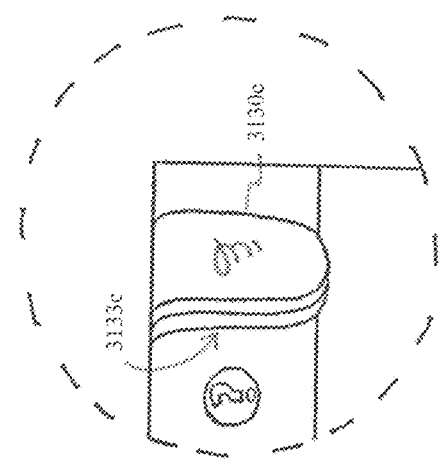
FIGS. 31A-31F are portions of GUIs showing examples of alternative virtual stack buttons with still another type of visual indicator.
Figure 31B:
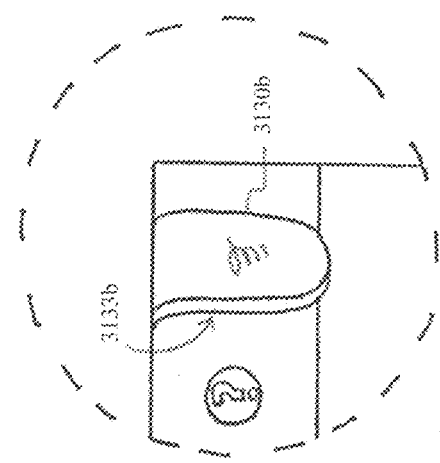
Figure 31C:
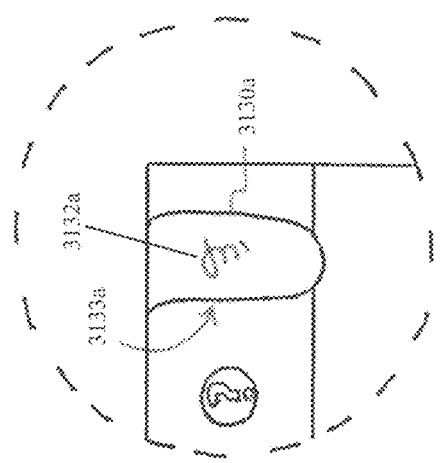
Figure 31D:
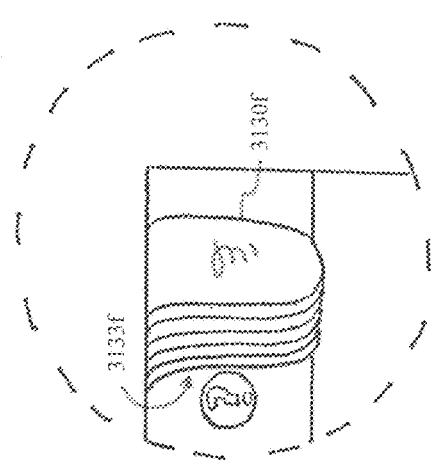
Figure 31E:
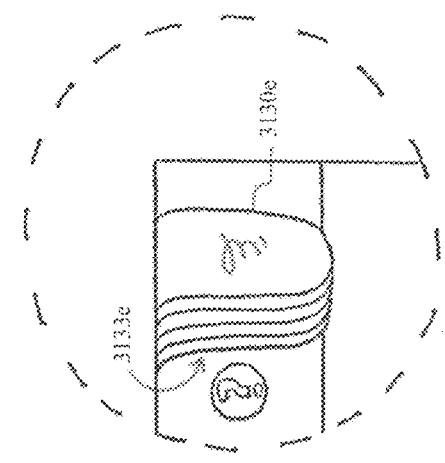
Figure 31F:
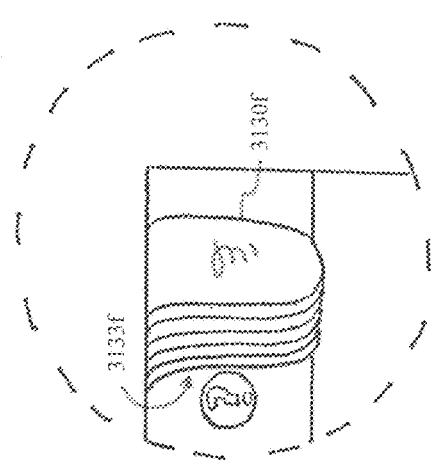

The selected part (the middle character's head) is itself made up of a group of defined subparts, such as hair, eyes, nose, mouth, optional eyeglasses, and so forth. If the user wishes to investigate or modify only one of these subparts, they can do so by a third "drill" task, which drills below the surface, so to speak, of the selected part (head) in order to break the individual subparts apart from each other so the user can isolate and access a single one of the subparts. The third drill task is opened and activated by a user touch on the drill icon in the upper right corner of the 4-corner menu of FIG. 26. This user action pauses or suspends the (still open) second drill task, and replaces the virtual stack button of FIG. 26 with another virtual stack button at the same location on the screen, and causes the Drill icon to become highlighted, as shown in FIG. 27. The virtual stack button in this figure is the same as that shown in FIG. 9C. The button has three bar-shaped elements (see elements 934c in FIG. 9C), because three branched tasks—the first and second drill tasks (currently suspended) and the third drill task—are open. Stated differently, N=3. The button again includes a tornado-shaped graphic image to remind the user the currently active task is a drill task. (If the user had instead launched another type of task as the third task, the tornado symbol 932c would instead be a different non-alphanumeric symbol associated with such different task.) If the user wished to exit this third drill task at this stage, they would touch, click, or otherwise trigger the virtual stack button, which would close the task and return operation to the status of FIG. 26. As such, the virtual stack button would be replaced by the virtual stack button of FIG. 9B, and the Drill icon on the 4-corner menu would no longer be highlighted.

The reader will appreciate that this process can be carried out for any number N of branched tasks. For the particular size and shape of the virtual stack button and bar-shaped elements shown in FIGS. 9A-9D, the button can accommodate up to about 5 such bars. The software can be configured in numerous alternative ways to deal with situations where N becomes greater than 5. In one option, the width of the bars can be progressively reduced while keeping the outline of the button the same, so that more than 5 bars can fit within the button. In another option, the software stops adding bars after 5, or stated differently, only 5 bars are shown in the button even when N>5. In another option, other elements, such as vertically-oriented bars (stripes), can be added to the button one at a time to supplement the 5 bars. In another option, a numerical indicator, such as "+1", "+2", etc. can be added to the button to supplement the 5 bars. These are only some of the many options available to deal with larger numbers of open tasks.

In the figures that follow, we show other ways the software can be made to implement a visual indicator on a virtual button that represents a stack of open tasks. For ease of illustration and understanding, these figures show only the small portion of the GUI that contains the virtual button, and in some cases, only the virtual button itself is shown.

FIGS. 29A-F show a sequence of virtual stack buttons for cases where the number of open tasks, N, goes from 1 to 6. The virtual buttons in this example do not include any non-alphanumeric symbol, or any other symbol, associated with the currently active task. Nor do these virtual buttons incorporate any bar-shaped elements like those described above. Instead, these buttons utilize a border that becomes layered as N exceeds 1. Thus, in FIG. 29A, N=1, and a virtual stack button 2930a is provided as part of the GUI. The button 2930a has a boundary or border roughly in the shape of a U that is closed on top. A left portion of that border is labeled 2933a. When another task is opened, and N=2, the button 2930a is replaced by the button 2930b of FIG. 29B. The left border 2933b of that button is slightly extended relative to the left border in FIG. 29A, and the left side of the button is made up of 2 spaced-apart copies of the left border to provide the button 2930b with the appearance of a layered border. In this case, the number of layers (2) equals the number of open tasks (N=2), When another task is opened, and N=3, the button 2930b is replaced by the button 2930c of FIG. 29C. The left border 2933c of that button is slightly extended relative to the left border in FIG. 29B, and the left side of the button is made up of 3 spaced-apart copies of the left border to provide the button 2930c with the appearance of a layered border, the number of layers (3) being equal to the number of open tasks (N=3). When a fourth task is opened, and N=4, the button 2930c is replaced by the button 2930d of FIG. 29D. The left border 2933d of that button is slightly extended relative to the left border in FIG. 29C, and the left side of the button is made up of 4 spaced-apart copies of the left border to provide the button 2930d with the appearance of a layered border, the number of layers (4) being equal to the number of open tasks. When a fifth task is opened, and N=5, the button 2930d is replaced by the button 2930e of FIG. 29E. The left border 2933e of that button is slightly extended relative to the left border in FIG. 29D, and the left side of the button is made up of 5 spaced-apart copies of the left border to provide the button 2930e with the appearance of a layered border, the number of layers (5) being equal to the number of open tasks. When a sixth task is opened, and N=6, the button 2930e is replaced by the button 2930f of FIG. 29F. The left border 2933f of that button is slightly extended relative to the left border in FIG. 29E, and the left side of the button is made up of 6 spaced-apart copies of the left border to provide the button 2930f with the appearance of a layered border, the number of layers (6) being equal to the number of open tasks.

Unlike the virtual stack buttons of FIGS. 9A-9D, the buttons of FIGS. 29A-F do not all have the same size and footprint, i.e., boundary. In fact, no two of the buttons of FIGS. 29A-F are exactly the same size. However, the buttons of FIGS. 29A-F are all displayed on their respective GUIs at a consistent location on the display screen, for ease of the user who wishes to rapidly tap or cycle through the various open tasks. Stated differently, the buttons of FIGS. 29A-F, when consecutively displayed on the screen, all occupy substantially the same minor place on the display screen. Any two of these buttons, or any consecutive pair of these buttons, may satisfy the condition that the respective buttons fill respective minor spaces that overlap each other, so that one such minor space is encompassed by, and underfills, the other such minor space.

Similar to FIGS. 29A-F, FIGS. 30A-F are portions of GUIs showing examples of alternative virtual stack buttons as disclosed herein, with still another type of visual indicator of the number of open tasks. Thus, FIGS. 30A-F show a sequence of virtual stack buttons for cases where the number of open tasks, N, goes from 1 to 6. The buttons of these figures are similar to those of FIGS. 29A-F insofar as they do not incorporate any bar-shaped elements, and insofar as they utilize a layered border that increments and decrements in the same manner with increasing and decreasing N. In FIGS. 30A-F, the layered border aspect of the visual indicator is supplemented by a numeric symbol, i.e. a number, that equals N. Thus, in FIG. 30A, N=1, and a virtual stack button 3030a is provided as part of the GUI. A left portion of its border is labeled 3033a. The button contains a graphic symbol 3032a of the number "1". When another task is opened, and N=2, the button 3030a is replaced by the button 3030b of FIG. 30B. The left border 3033b of that button is slightly extended relative to the left border in FIG. 30A, and the left side of the button is made up of 2 spaced-apart copies of the left border to provide the button 3030b with the appearance of a layered border, just as in FIG. 29B. The button contains a graphic symbol 3032b of the number "2". When another task is opened, and N=3, the button 3030b is replaced by the button 3030c of FIG. 30C. The left border 3033c of that button is slightly extended relative to the left border in FIG. 30B, and the left side of the button is made up of 3 spaced-apart copies of the left border to provide the button 3030c with the appearance of a layered border, just as in FIG. 29C. The button contains a graphic symbol of the number "3". When a fourth task is opened, and N=4, the button 3030c is replaced by the button 3030d of FIG. 30D. The left border 3033d of that button is slightly extended relative to the left border in FIG. 30C, and the left side of the button is made up of 4 spaced-apart copies of the left border to provide the button 3030d with the appearance of a layered border, just as in FIG. 29D. The button contains a graphic symbol of the number "4". When a fifth task is opened, and N=5, the button 3030d is replaced by the button 3030e of FIG. 30E. The left border 3033e of that button is slightly extended relative to the left border in FIG. 30D, and the left side of the button is made up of 5 spaced-apart copies of the left border to provide the button 3030e with the appearance of a layered border, just as in FIG. 29E. The button contains a graphic symbol of the number "5". When a sixth task is opened, and N=6, the button 3030e is replaced by the button 3030f of FIG. 30F. The left border 3033f of that button is slightly extended relative to the left border in FIG. 30E, and the left side of the button is made up of 6 spaced-apart copies of the left border to provide the button 3030f with the appearance of a layered border, just as in FIG. 30F. The button contains a graphic symbol of the number "6".

The spatial characteristics and relationships discussed above in connection with FIGS. 29A-F also apply in like fashion to the virtual stack buttons of FIGS. 30A-F.

The virtual stack buttons of FIGS. 31A-F are substantially the same as those of FIGS. 30A-F, except that instead of including a numerical graphic symbol as part of the button, a non-alphanumeric symbol is used, and the non-alphanumeric symbol is preferably one that is specifically associated with the currently active task. Thus, in FIG. 31A, N=1, and a virtual stack button 3130a is provided as part of the GUI. A left portion of its border is labeled 3033a. The button contains a non-alphanumeric graphic symbol 3132a associated with the currently active task. When another task is opened, and N=2, the button 3130a is replaced by the button 3130b of FIG. 31B. The left border 3133b of that button is slightly extended, and the left side of the button is made up of 2 spaced-apart copies of the left border to provide a layered border. The button contains a non-alphanumeric graphic symbol associated with the newly opened, active task. When another task is opened, and N=3, the button 3130b is replaced by the button 3130c of FIG. 31C. The left border 3133c of that button is slightly extended, and the left side of the button is made up of 3 spaced-apart copies of the left border to provide a layered border. The button contains a non-alphanumeric graphic symbol associated with the newly opened, active task. When a fourth task is opened, and N=4, the button 3130c is replaced by the button 3130d of FIG. 31C. The left border 3133d of that button is slightly extended, and the left side of the button is made up of 4 spaced-apart copies of the left border to provide a layered border. The button contains a non-alphanumeric graphic symbol associated with the newly opened, active task. When a fifth task is opened, and N=5, the button 3130d is replaced by the button 3130e of FIG. 31E. The left border 3133e of that button is slightly extended, and the left side of the button is made up of 5 spaced-apart copies of the left border to provide a layered border. The button contains a non-alphanumeric graphic symbol associated with the newly opened, active task. When a sixth task is opened, and N=6, the button 3130e is replaced by the button 3130f of FIG. 31F. The left border 3133f of that button is slightly extended, and the left side of the button is made up of 6 spaced-apart copies of the left border to provide a layered border. The button contains a non-alphanumeric graphic symbol associated with the newly opened, active task.

Figure 32A:
FIGS. 32A-32D are a sequence of virtual stack buttons having another type of visual indicator.
Figure 32B:
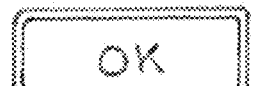
Figure 32C:
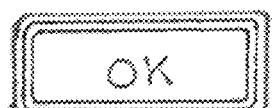
Figure 32D:
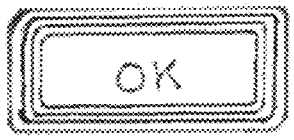

FIGS. 32A-D are a sequence of virtual stack buttons as described above, but having another type of visual indicator. In FIG. 32A, the number of open tasks in a stack of branched tasks, i.e. N, is assumed to be 1. A virtual stack button is provided as shown, having a generally rectangular boundary. The letters "OK" are included as part of the button as an indication to the user that triggering the button will accept, and optionally also close, the currently active task. When a second task is opened, and N=2, the button of FIG. 32A is replaced by the virtual stack button of FIG. 32B. The entire boundary or border of the new button is slightly extended relative to that of FIG. 32A, and the outer portion of the button is made up of 2 concentric copies of the entire border to provide a layered border. The letters "OK" are again included as an indication to the user of the button's function. When a third task is opened, and N=3, the button of FIG. 32B is replaced by the virtual stack button of FIG. 32C, The entire boundary or border of the new button is slightly extended relative to that of FIG. 32B, and the outer portion of the button is made up of 3 concentric copies of the entire border to provide a layered border. The letters "OK" are again included as an indication to the user of the button's function. When a fourth task is opened, and N=4, the button of FIG. 32C is replaced by the virtual stack button of FIG. 32D. The entire boundary or border of the new button is slightly extended relative to that of FIG. 32C, and the outer portion of the button is made up of 4 concentric copies of the entire border to provide a layered border. The letters "OK" are again included as an indication to the user of the button's function. This process can be extended to values of N greater than 4.

Figure 33A:
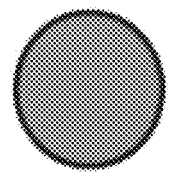
FIGS. 33A-33E are a sequence of virtual stack buttons having still another type of visual indicator.
Figure 33B:
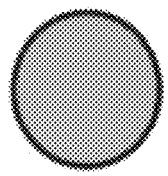
Figure 33C:
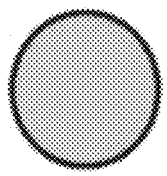
Figure 33D:
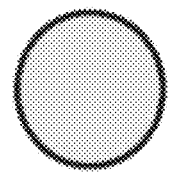
Figure 33E:
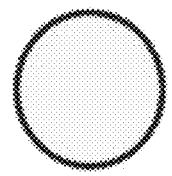

FIGS. 33A-E are a sequence of virtual stack buttons as described above, but having still another type of visual indicator. The buttons of these figures are shown as having a circular shape, but they may have other shapes as disclosed herein, and they may all have the same size and shape, or somewhat different sizes and shapes as discussed above. Each of these buttons is preferably provided as a small part of a GUI or task window, in connection with a stack of branched, open tasks as discussed above. Furthermore, these buttons in some, most, or all of their related task windows are preferably located at a given predetermined, consistent place on the display screen, which we refer to as a minor space on the display. Graphic symbols may also be included as part of the buttons as discussed above. The visual indicator used by the buttons of FIGS. 33A-E is one or more of brightness, opacity, color, and hue. Thus, for example, if N (the number of currently open branched tasks) is small, the brightness of the button may be low, whereas if N is large, the brightness may be high, or vice versa. In FIG. 33A, a virtual stack button of low brightness is shown, and N may equal 1. In FIG. 33B, a virtual stack button of higher brightness is shown, and N may equal 2. In FIG. 33C, a virtual stack button of still higher brightness is shown, and N may equal 3. In FIG. 33D, a virtual stack button of still higher brightness is shown, and N may equal 4. In FIG. 33E, a virtual stack button of still higher brightness is shown, and N may equal 4.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

The invention claimed is:

1. A computer-implemented method for providing graphical user interfaces (GUIs) for a number N of simultaneously open branched tasks in a software program, N being at least 2, the method comprising:
   designating a first task of the simultaneously open branched tasks as active, and designating remaining one(s) of the simultaneously open branched tasks as suspended;
   displaying a first GUI when the first task is active, the first GUI comprising a first virtual button;
   providing the first virtual button with a visual indicator that is indicative of N; and
   configuring the first virtual button such that, when it is triggered by a user, the first task closes such that there are only N−1 simultaneously open branched tasks, and a second task of the suspended, remaining one(s) of the simultaneously open branched tasks becomes active, and a second GUI is displayed.

2. The method of claim 1, wherein the method is carried out by a device having a display, and wherein each GUI of the simultaneously open branched tasks, when displayed, fills a same major space on the display.

3. The method of claim 2, wherein the display has a characteristic dimension less than 9 inch.

4. The method of claim 1, wherein the method is carried out by a device having a display, and wherein the first virtual button fills a first minor space on the display, and wherein the second GUI comprises a second virtual button that fills a second minor space on the display and which, when triggered by the user, closes the second task, and wherein the first minor space overlaps the second minor space.

5. The method of claim 4, wherein each GUI of the simultaneously open branched tasks has a respective virtual button that fills a respective minor space on the display and which, when triggered by the user, closes its respective task, and wherein the respective minor spaces overlap.

6. The method of claim 5, wherein each of the respective minor spaces fills a same minor space on the display.

7. The method of claim 5, wherein for any two of the respective minor spaces, one such minor space is encompassed by and underfills another such minor space.

8. The method of claim 1, wherein triggering of the first virtual button by the user also causes a setting of the first task to be stored and used by one or more of the remaining one(s) of the simultaneously open branched tasks.

9. The method of claim 1, wherein the visual indicator comprises bar-shaped elements located on the first virtual button.

10. The method of claim 1, wherein the visual indicator comprises a layered border of the first virtual button.

11. The method of claim 1, wherein the visual indicator comprises a brightness of at least a portion of the virtual button.

12. The method of claim 1, wherein the visual indicator does not comprise any numerical character.

13. The method of claim 1, wherein the first virtual button includes a first non-alphanumeric symbol associated with the first task.

14. The method of claim 1, wherein the method is carried out by a processing device in connection with a display and a user input device that interacts with the display.

15. A non-transitory computer-readable storage medium having instructions that, when executed by a processing device coupled to a display screen, cause the processing device to perform operations comprising:
  providing a plurality of branched tasks including at least a first and second branched task configured such that when the first branched task is active and the second branched task is initiated, the second branched task becomes active and the first branched task becomes suspended until the second branched task is closed, the plurality of branched tasks optionally also including a third branched task configured such that when the first branched task is suspended and the second branched task is active and the third branched task is initiated, the third branched task becomes active, the second branched task becomes suspended until the third branched task is closed, and the first branched task remains suspended until the second branched task is closed;
  providing a plurality of GUIs associated respectively with the plurality of branched tasks, the plurality of GUIs including a first GUI for the first branched task, a second GUI for the second branched task, and optionally a third GUI for the third branched task; and
  displaying on the display screen at any given time an active GUI selected from the plurality of GUIs in accordance with which one of the branched tasks is currently active;
  wherein the first and second GUIs include respective first and second virtual buttons, configured such that selection by a user of the second virtual button closes the second branched task, and selection by the user of the first virtual button closes the first branched task;
  wherein the first and second virtual buttons occupy respective first and second minor spaces on the display screen, the first minor space overlapping the second minor space; and
  wherein at least the second virtual button includes a visual indicator that is indicative of how many of the branched tasks are currently open.

16. The storage medium of claim 15, wherein the first and second virtual buttons each include the visual indicator, and the visual indicator comprises a number of bar-shaped elements equal to how many of the branched tasks are currently open.

17. The storage medium of claim 15, wherein the first and second virtual buttons each include the visual indicator, and wherein the visual indicator comprises a layered border, the layered border having a number of apparent layers equal to how many of the branched tasks are currently open.

18. The storage medium of claim 15, wherein the first and second virtual buttons each include the visual indicator, and wherein the visual indicator comprises a brightness characteristic.

19. The storage medium of claim 15, wherein the first and second virtual buttons each include the visual indicator, and wherein the visual indicator does not comprise any numerical character.

20. The storage medium of claim 15, wherein the second virtual button includes a non-alphanumeric symbol associated with the second task.

* * * * *